United States Patent [19]
Tomita et al.

[11] Patent Number: 5,148,332
[45] Date of Patent: Sep. 15, 1992

[54] AUTOMATIC CASSETTE TAPE RECORDING AND REPRODUCING APPARATUS WITH A PIVOTABLE MAGAZINE HOLDER

[75] Inventors: Masami Tomita; Seiji Kishikawa; Yoshinori Kakuta, all of Nagaokakyo, Japan

[73] Assignee: Mitsubishi Denki Kabushiki Kaisha, Tokyo, Japan

[21] Appl. No.: 492,990

[22] Filed: Mar. 13, 1990

[30] Foreign Application Priority Data

Mar. 20, 1989 [JP] Japan .................................. 1-68009
Mar. 20, 1989 [JP] Japan .................................. 1-68014
Aug. 11, 1989 [JP] Japan ................................. 1-209029

[51] Int. Cl.$^5$ ................ G11B 15/68; G11B 15/675
[52] U.S. Cl. .......................... 360/92; 360/96.6; 360/96.5
[58] Field of Search .............. 360/92, 96.5, 96.6, 360/85, 71, 69

[56] References Cited

U.S. PATENT DOCUMENTS

| | | | |
|---|---|---|---|
| 3,127,178 | 3/1964 | Osborne et al. | 360/92 |
| 3,127,179 | 3/1964 | Osborne et al. | 360/92 |
| 3,578,334 | 5/1971 | Ban | 360/92 |
| 3,589,733 | 6/1971 | Piotrowski | 360/92 |
| 3,604,713 | 9/1971 | Karnopp et al. | 360/92 |
| 3,693,981 | 9/1972 | Ban | 360/92 |
| 4,319,290 | 3/1982 | Bolick, Jr. et al. | 360/92 |
| 4,471,394 | 9/1984 | Hapke | 360/92 |
| 4,519,009 | 5/1985 | Bolick, Jr. | 360/92 |
| 4,670,866 | 6/1987 | Hasegawa et al. | 369/36 |

FOREIGN PATENT DOCUMENTS

| | | |
|---|---|---|
| 0013806 | 8/1980 | European Pat. Off. . |
| 0055249 | 6/1982 | European Pat. Off. . |
| 0060396 | 9/1982 | European Pat. Off. . |
| 0071936 | 2/1983 | European Pat. Off. . |
| 61-82607 | 10/1987 | Japan . |
| 61-82610 | 10/1987 | Japan . |

Primary Examiner—John H. Wolff
Assistant Examiner—Craig A. Renner
Attorney, Agent, or Firm—Birch, Stewart, Kolasch & Birch

[57] ABSTRACT

An automatic cassette tape recording and reproducing apparatus having a plurality of cassettes mounted wherein any tape cassette for a reproducing or recording operation may be selected. The apparatus includes a swinging base with a revolving turntable having cassette holders, a turntable revolving mechanism for revolving the turntable when a cassette is selected, and a position detecting mechanism for positioning and identifying the cassette selected by the turntable revolving mechanism. The apparatus also includes a deck on which the selected cassette is mounted when the swinging base comes to a position for playing.

7 Claims, 24 Drawing Sheets

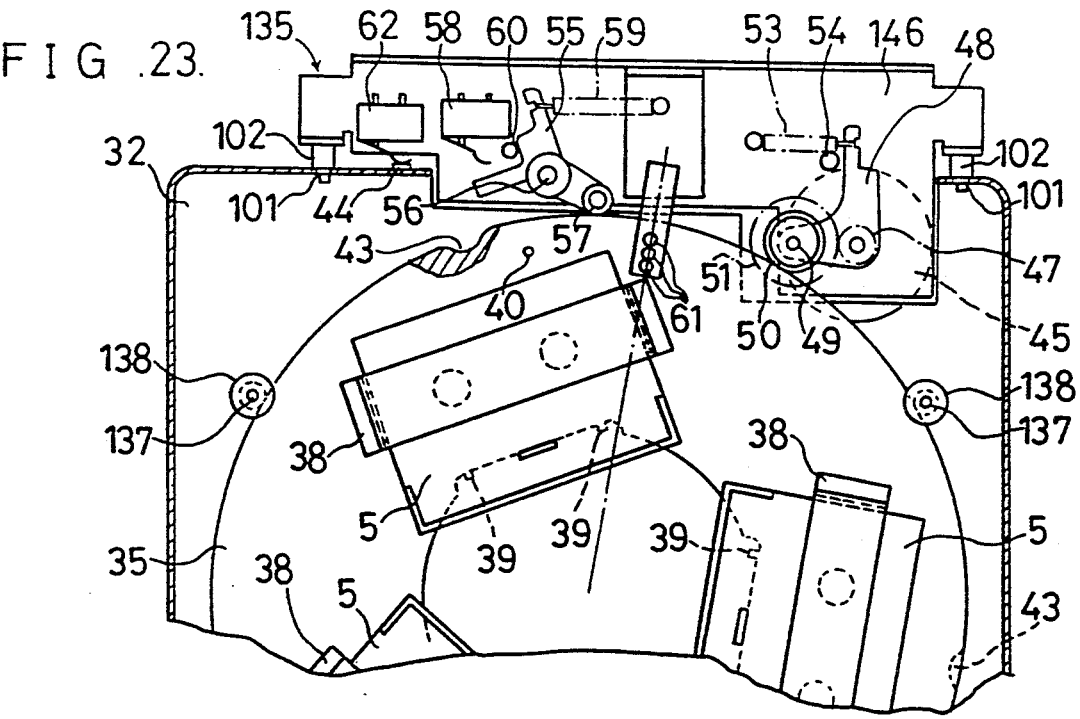
FIG. 23.
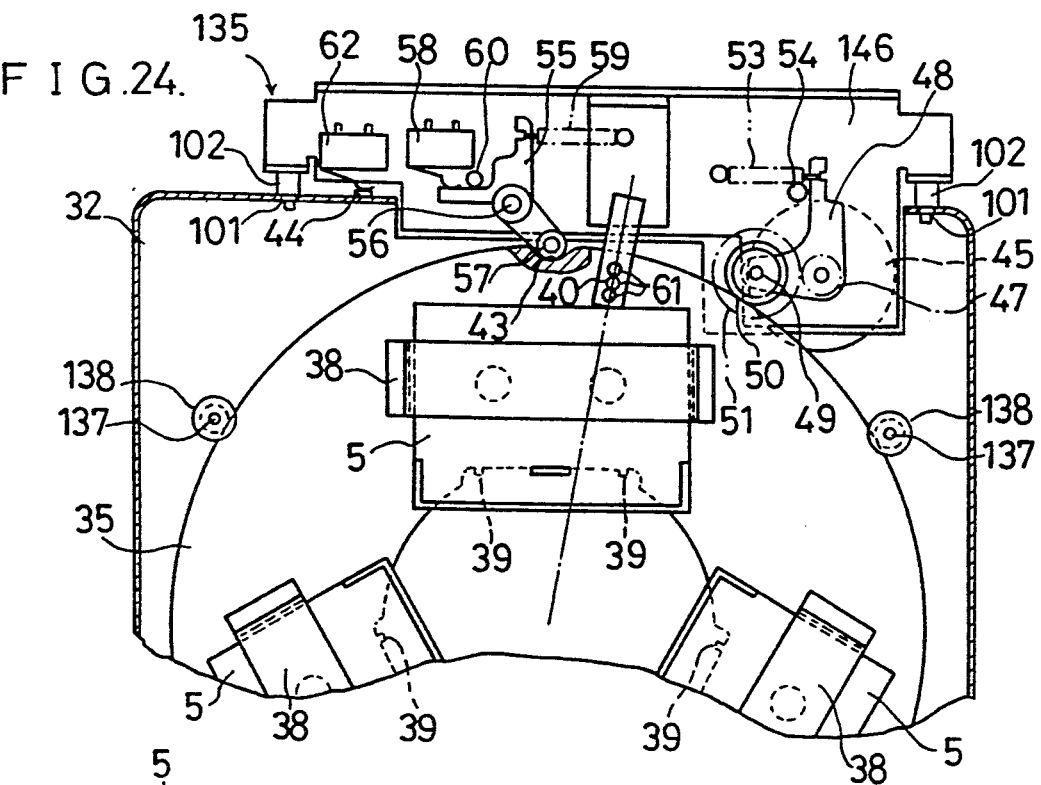
FIG. 24.
FIG. 25.

AUTOMATIC CASSETTE TAPE RECORDING AND REPRODUCING APPARATUS WITH A PIVOTABLE MAGAZINE HOLDER

FIELD OF THE INVENTION

The present invention relates to an automatic cassette tape recording and reproducing apparatus in which a plurality of cassette tapes can be automatically and continuously recorded or reproduced and wherein a signal reproducing or editing operation is performed between the plurality of cassette tapes.

BACKGROUND OF THE INVENTION

FIGS. 38 to 40 show a conventional automatic cassette tape recording and reproducing apparatus disclosed in Japanese Utility Model Publication Gazette No. 51-20754. FIG. 38 is a top view, FIG. 39 is a left side view and FIG. 40 is a sectional view taken along a line IV X—IV X in FIG. 38.

In FIGS. 38 to 40, reference numeral 1 designates a base plate. A magazine 2 and a deck 3 are mounted on an upper surface of the base plate 1. The magazine 2 is rotatable around a shaft 4 fixed on the base plate 1. Holders 6 for arranging the cassettes 5 are fixed on the magazine 2 in a radial manner around the center of the shaft 4. Reference numeral 7 designates a support formed on the magazine 2 for pivoting the holder 6, reference numeral 8 designates a motor for rotating the magazine 2 through a pulley 9 fixed on a motor axis, belt 10 and a pulley 12 fixed on a pipe shaft 11 which is rotatable around the shaft 4. Reference numeral 13 designates a middle sheet fitted in the pipe shaft 11, on which a projection 15 which is engaged with a cam trench 14 on the pipe shaft 11 is provided. The middle sheet 13 moves in a direction vertical to the base plate 1 along the cam trench 14. In addition, a lever 17 comprising a cam 16 is fixed on the middle sheet 13. The cam 16 can be in contact with a pendent cam driven part 18 provided in the holder 6 when the middle sheet 13 vertically moves. Reference numeral 19 designates a motor for rotating a circular cam 23 through a gear 21 and a transmission gear 22 fixed on the motor shaft to swing the deck 3 around a supporting shaft 20. Reference numeral 24 designates a spring for forcing the deck 3 counterclockwise around the supporting shaft 20, reference numeral 25 designates a lever swinging around a supporting shaft 26, on which a pin 27 which is engaged with a cam surface 23a of the circular cam 23 is fixed, reference numeral 28 designates a crank connecting the lever 25 to the deck 3 and reference numeral 29 designates a reel rest.

Next, operation thereof will be described.

In an initial state, the cassettes are all held by the holders 6 in such a manner that longitudinal sides thereof are vertical to the base plate 1, the pin 27 of the lever 25 is out of the concave part of the cam surface 23a of the circular cam 23, and the deck 3 is pivoted clockwise against the force of the spring 24 (FIG. 39).

When a cassette 5 to be played is selected through an operation button (not shown), the magazine 2 is rotated around the shaft 4 by the motor 8 and the cassette 5 to be played is set at a position A shown in FIG. 40. When the motor 8 is rotated in a reverse direction and in accordance with it, the pipe shaft 11 is rotated in a reverse direction, the middle sheet 13 is moved upward and the cam 16 pushes the pendent cam driven part 18 upward. Then, the holder 6 is rotated in a direction shown by an arrow 30 by 90° around the support 7. As a result, the cassette 5 to be played is set at a position B in FIG. 40. Then, when the circular cam 23 is rotated by the motor 19, the pin 27 on the lever 25 is engaged with the concave part of the cam surface 23a and the lever 25 pivots counterclockwise by force of the spring 24. As a result, the cassette 5 is engaged with the reel rest 29 and prepared for playing.

When another cassette 5 is selected, the motor 19 is rotated first at this time. Then, the pin 27 moves out of the concave part of the cam surface 23a, the deck 3 returns to an initial position and the motor 8 is rotated. Thus, another cassette 5 is selected.

Since the conventional automatic cassette tape recording and reproducing apparatus is structured as described above, mechanisms for driving the magazine 2 and the deck 3 and moving space therefor are necessary. Therefore, the driving mechanism becomes complicated and the number of parts is increased, with the result that there is a limit in reducing the size of the apparatus. Namely, the driving mechanisms for preparing the cassette for playing has to comprise two mechanisms for rotating the magazine 2 and then rotating the holder 6 around the support 7 by 90° and also comprise one mechanism for swinging the deck 3 around the supporting shaft 20. As a result, the driving mechanisms become complicated and the number of parts is increased.

In addition, since the above three operations are performed in the apparatus, moving space therefor is necessary. Thus, there is a limit in reducing the size of the apparatus.

Furthermore, a plurality of cassette tapes can be mounted and they can be automatically recorded on or reproduced from. However, only one deck for recording and reproducing the cassette is provided and therefore, a signal reproducing or editing operation can not be performed between the plurality of the cassette tapes.

SUMMARY OF THE INVENTION

The present invention was made in order to solve the above problems and it is an object of the present invention to provide an automatic cassette tape recording and reproducing apparatus in which a deck driving mechanism is not necessary since the deck is fixed. As a result, driving mechanisms can be simple and the size thereof can be reduced.

It is another object of the present invention to provide an automatic cassette tape recording and reproducing apparatus in which driving mechanisms are simple because the driving mechanism for the magazine is used only for rotation thereof and the driving mechanism for the deck is used only for vertical movement thereof; accordingly, and the size of the apparatus can be reduced.

It is a further object of the present invention to provide an automatic cassette tape recording and reproducing apparatus in which driving mechanisms are simple because the driving mechanism for the magazine is used only for rotation thereof and the driving mechanism for the deck is used only for vertical movement thereof. The signal reproducing or editing operation is performed between a plurality of cassette tapes because a plurality of recording and reproducing decks are provided, and the size of the apparatus can be reduced.

An automatic cassette tape recording and reproducing apparatus in accordance with the present invention comprises a swinging base with a rotatable turntable having cassette holders, a turntable revolving mechanism for revolving the turntable and a position detecting mechanism for positioning and identifying the cassette, and a deck.

An automatic cassette tape recording and reproducing apparatus in accordance with the present invention comprises a dismountable magazine having a rotatable turntable and cassette holders for holding a plurality of cassettes on the turntable, a turntable revolving mechanism for revolving the turntable, a position detecting mechanism for positioning and identifying the cassette and a driving mechanism for driving a deck, in which the plurality of cassettes are arranged in such a manner that a tape surface of each cassette is vertical to a turntable surface. A longitudinal direction of each cassette is parallel to the turntable surface and at the same distance from the center of the turntable and a magnetic surface thereof is directed toward the center of the turntable.

An automatic cassette tape recording and reproducing apparatus in accordance with the present invention comprises a plurality of recording and reproducing decks, a dismountable magazine having a rotatable turntable and cassette holders for holding a plurality of cassettes, a revolving mechanism for revolving the turntable, a position detecting mechanism for positioning and identifying the cassette and a driving mechanism for driving the deck, in which the plurality of cassettes are arranged in such a manner that a tape surface of each cassette is vertical to a turntable surface. A longitudinal direction of each cassette is parallel to the turntable surface and at the same distance from the center of the turntable and a magnetic surface thereof is directed toward the center of the turntable.

According to the automatic cassette tape recording and reproducing apparatus in accordance with the present invention, the turntable is revolved by the turntable revolving mechanism when a cassette to be played is selected. Then, the cassette is positioned and identified by the position detecting mechanism and then the cassette is mounted on the deck by the swinging base so as to be played.

According to an automatic cassette tape recording and reproducing apparatus in accordance with the present invention, the turntable in the magazine is revolved by the turntable revolving mechanism when a cassette to be played is selected. Then, the cassette is positioned and identified by the position detecting mechanism and mounted on the deck by the deck driving mechanism so as to be played. Furthermore, a signal reproducing or editing operation is performed between a plurality of cassette tapes by a plurality of recording and reproducing decks.

Further scope of applicability of the present invention will become apparatus from the detail description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 23 is a detailed plan view showing a state in which the magazine is mounted but a cassette to be played is not yet selected in the fourth embodiment of the present invention;

FIG. 24 is a detailed plan view showing a state in which the cassette to be played is selected in the fourth embodiment of the present invention;

FIG. 25 is a side view showing a fifth embodiment of the present invention;

DESCRIPTION OF PREFERRED EMBODIMENTS

Figure 1:
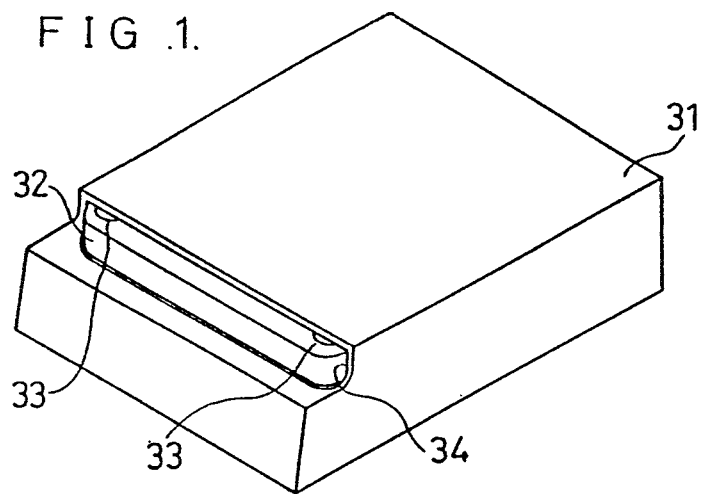
FIG. 1 is a perspective view showing an automatic cassette tape recording and reproducing apparatus in accordance with a first embodiment of the present invention.

Embodiments of the present invention will be described in detail with reference to the drawings.

FIGS. 1 to 11 are perspective views showing an automatic cassette tape recording and reproducing apparatus in accordance with a first embodiment of the present invention. In FIGS. 1 to 11, reference numeral 31 designates an apparatus body and reference numeral 32 designates a magazine on which a claw 33 is provided in order to easily mount or dismount the magazine 32 on or from the apparatus body 31. Reference numeral 34 designates a front opening through which the magazine 32 is inserted into the apparatus body 31 or taken out of it.

Figure 2:
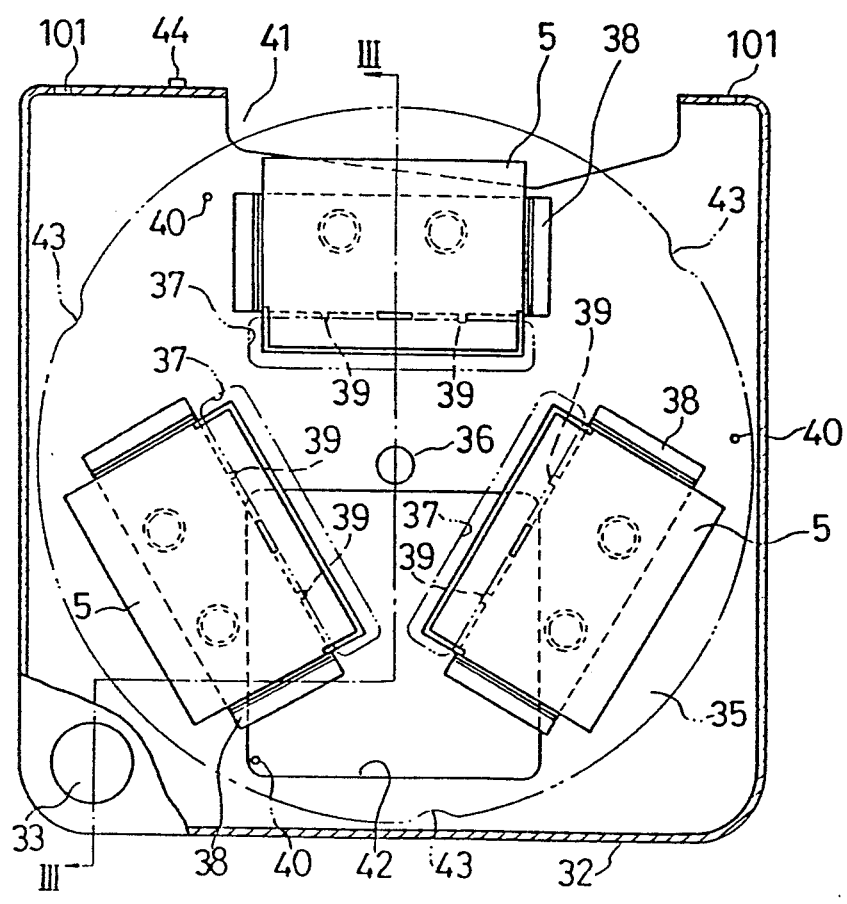
FIG. 2 is a transverse plan view showing the inside of a magazine shown in FIG. 1 in detail.
Figure 3:
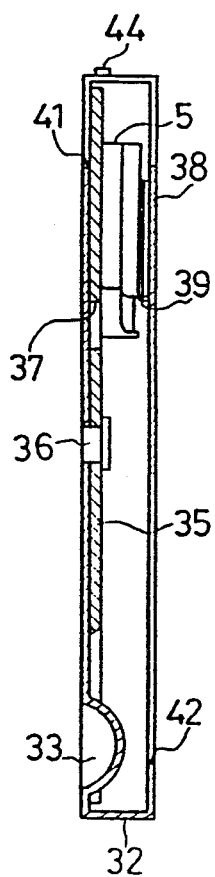
FIG. 3 is a sectional view taken along a line III—III in FIG. 2.

FIG. 2 is a transverse plan view showing the inside of the magazine 32 in detail and FIG. 3 is a sectional view taken along a line III—III in FIG. 2. A turntable 35 is mounted in such a manner that it can be revolved around a shaft 36 fixed on the magazine 32. Reference numeral 37 designates a clearance formed in the turntable 35. A plurality of cassette holders 38 are provided on the turntable 35, which guide the cassette 5 into its inserted direction and control the movement of the cassette 5 in the vertical direction thereof. Reference numeral 39 designates a stopper provided on the turntable 35, which determines a position of the cassette 5 in its inserted direction. Reference numeral 40 designates an identification hole for identifying the plurality of cassettes 5 which are identified by a distance between the center of the turntable 35 and the identification hole 40. Reference numeral 41 designates a cut off part provided for insertion of the cassette 5 and of a turntable revolving mechanism in a state where the magazine 32 is mounted in the apparatus body 31. Reference numeral 42 designates a cut off hole provided on the magazine 32, through which a deck mechanism is inserted. Reference numeral 43 designates a concave part provided at a lower part of an outer peripheral surface of the turntable 35. Reference numeral 44 designates a projection provided at an outer edge of the magazine 32 and reference numeral 101 designates a hole part.

Figure 4:
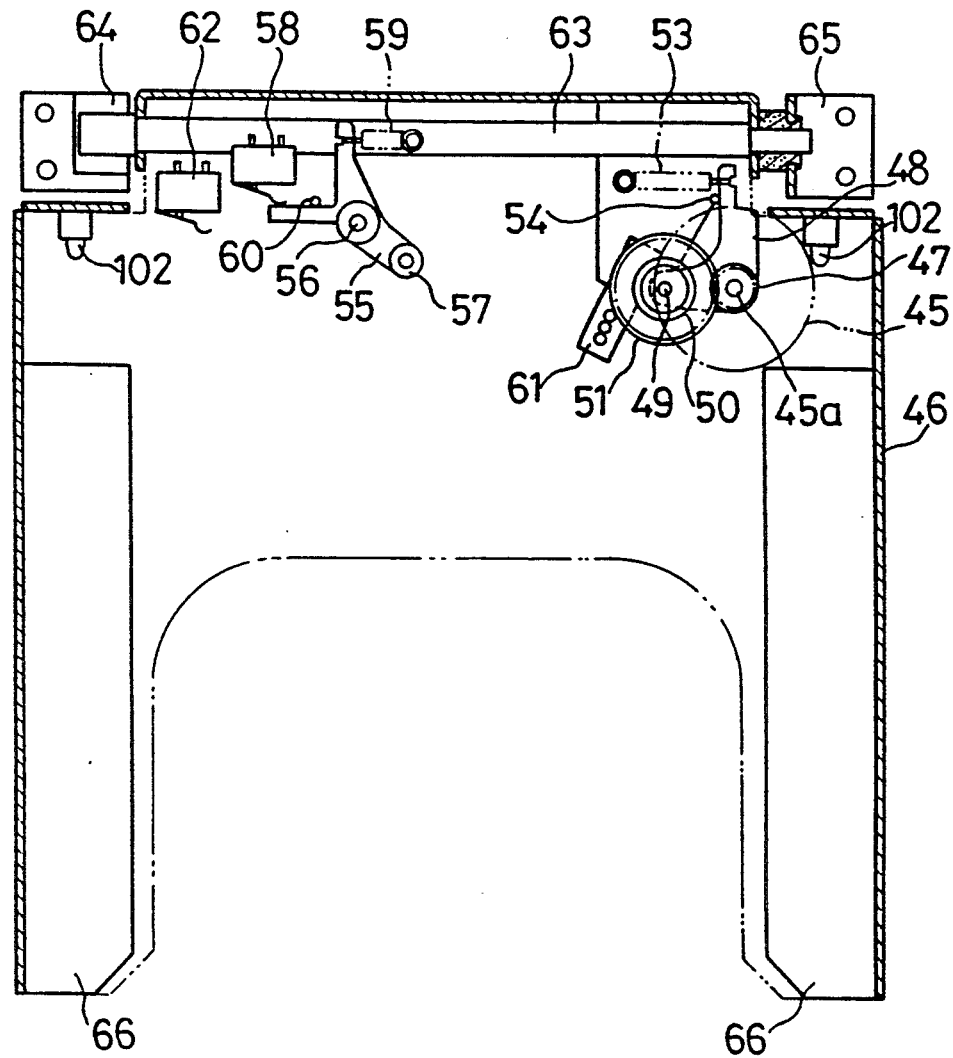
FIG. 4 is a transverse plan view showing a swinging base in order to show a turntable revolving mechanism in detail.
Figure 5:
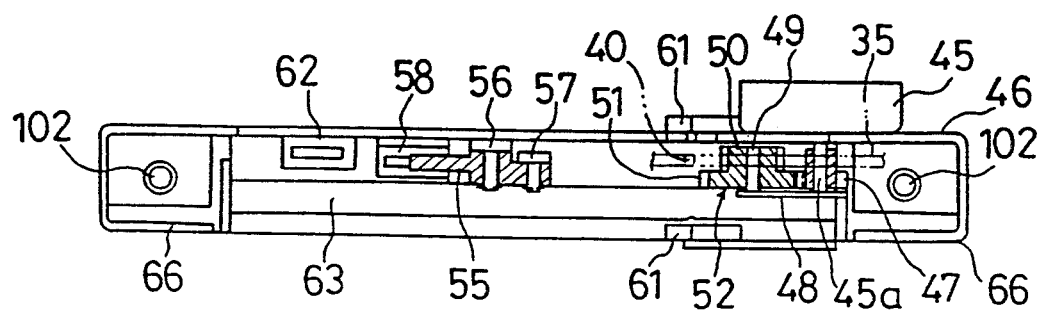
FIG. 5 is a partially vertical front view of FIG. 4.

FIG. 4 is a transverse plan view showing a swinging base in order to show the turntable revolving mechanism in detail and FIG. 5 is a partially transverse front view of FIG. 4. In FIGS. 4 and 5, reference numeral 45 designates a motor for revolving the turntable 35, which is fixed on the swinging base 46. A gear 47 is fixed on an axis 45a of the motor 45 and a lever 48 swinging around the axis 45a is fitted therein. A shaft 49 is fixed on the lever 48. There is provided a rotor 52 rotating around this shaft 49. The rotor 52 comprises a idler 50 at an upper part, having an outer peripheral surface formed of a material with a large friction coefficient such as an elastic body and capable of being in contact with an upper part of the outer peripheral surface of the turntable 35, and a gear part 51 engaged with the gear 47 at a lower part. The lever 48 is forced counterclockwise around the axis 45a of the motor 45 by force of a spring 53, which force by the spring 53 is set so as to be able to sufficiently transfer driving force of the motor 45 when the idler 50 is pressed to the outer peripheral surface of the turntable 35. Reference numeral 54 designates a stopper of the lever 48 while the magazine 32 is not mounted. Reference numeral 55 designates a position detecting lever for positioning the cassette 5 on the turntable 35 in the rotating direction thereof, which lever is rotatable around a shaft 56 fixed on the swinging base 46. The position detecting lever 55 comprises a roller 57 positioned so as to be engaged with the concave part 43 provided at the lower part of the outer peripheral surface of the turntable 35. A switch 58 detects whether the roller 57 is engaged with the concave part 43 or on the outer peripheral surface of the turntable 35. The position detecting lever 55 is forced clockwise around the shaft 56 by a spring 59. Reference numeral 60 designates a stopper of the position detecting lever 55 while the magazine is not mounted. Force by the spring 59 is set such that the roller 57 can be urged out of the concave part 43 onto the outer peripheral surface of the turntable 35 by the revolving force of the turntable 35. Reference numeral 61 designates a photoelectric switch for identifying the plurality of cassettes 5 and it is provided corresponding to each of the identification holes 40 on the turntable 35. Each photoelectric switch 61 is arranged on a straight line crossing the revolving center of the turntable 35 in such a manner that any one of the identification holes 40 coincides with the position of the photoelectric switch 61 when the roller 57 is engaged with the concave part 43. Reference numeral 102 designates a reference pin for determining an inserting end position of the magazine 32 in the apparatus body 31, which can be engaged with the hole part 101 of the magazine 32. Reference numeral 62 designates a switch which can be engaged with the projection 44 of the magazine 32 when the reference pin 102 is engaged with the hole part 101. Reference numeral 63 designates a shaft for pivoting the swinging base 46, comprising one end pressed into a mounting part 64 through the swinging base 46 and the other end fixed in a mounting part 65. Reference numeral 66 designates guide parts formed on right and left sides of the swinging base 46 for guiding the magazine 32 into the swinging base 46.

Figure 6:
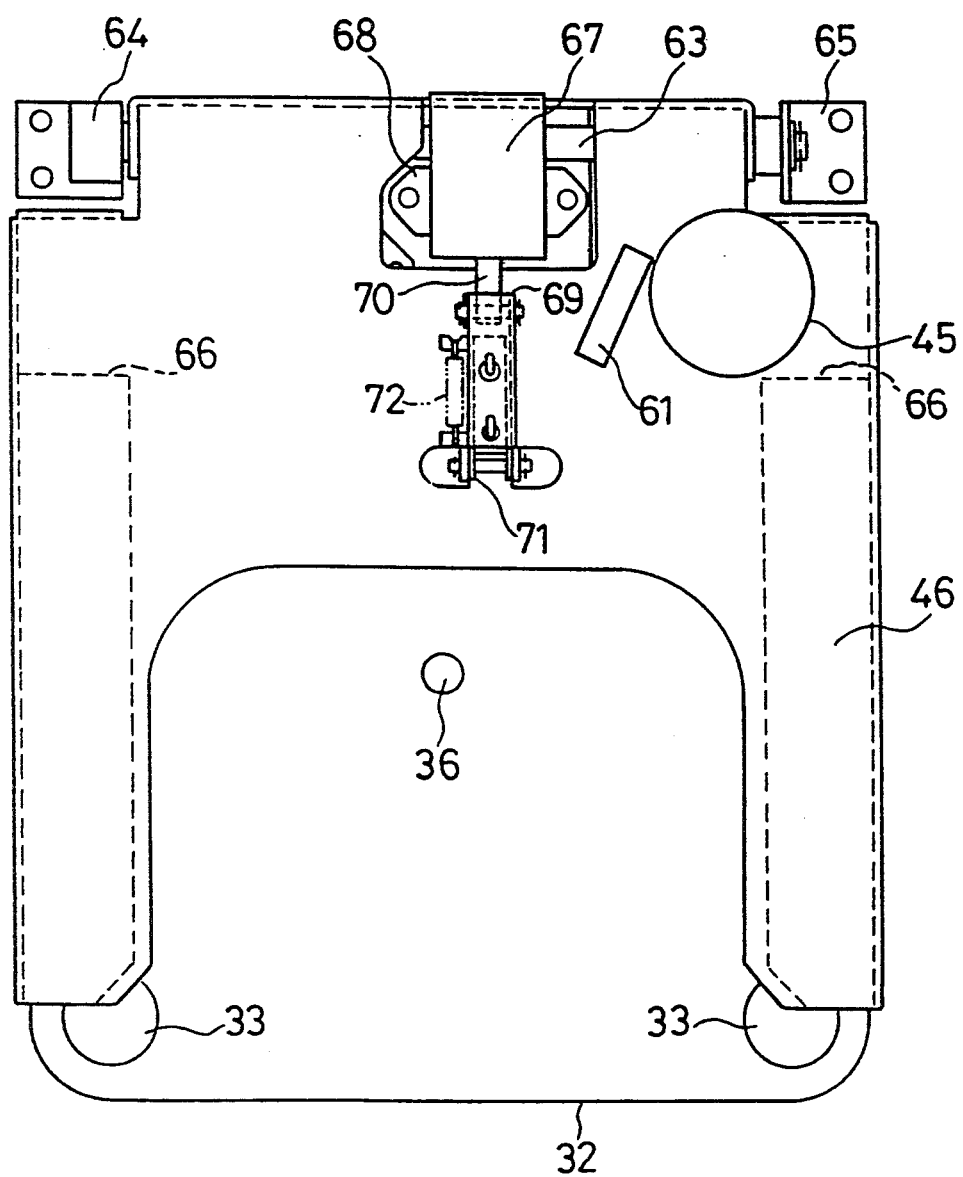
FIG. 6 is a plan view showing the swinging base in order to show a swinging mechanism for the swinging base.

FIG. 6 is a plan view showing a swinging base in order to show a swinging mechanism of the swinging base 46. In FIG. 6, reference numeral 67 designates a push-pull type plunger solenoid for swinging the swinging base 46, which is fixed on the apparatus body 31 through the holder 68. Reference numeral 69 designates a first connection bar pivoted by a movable part 70 of the plunger solenoid 67, which can slide along a second connection bar 71 pivoted by the swinging base 46. A tension spring 72 is engaged with one end of each of the first and second connection bars.

Figure 7:
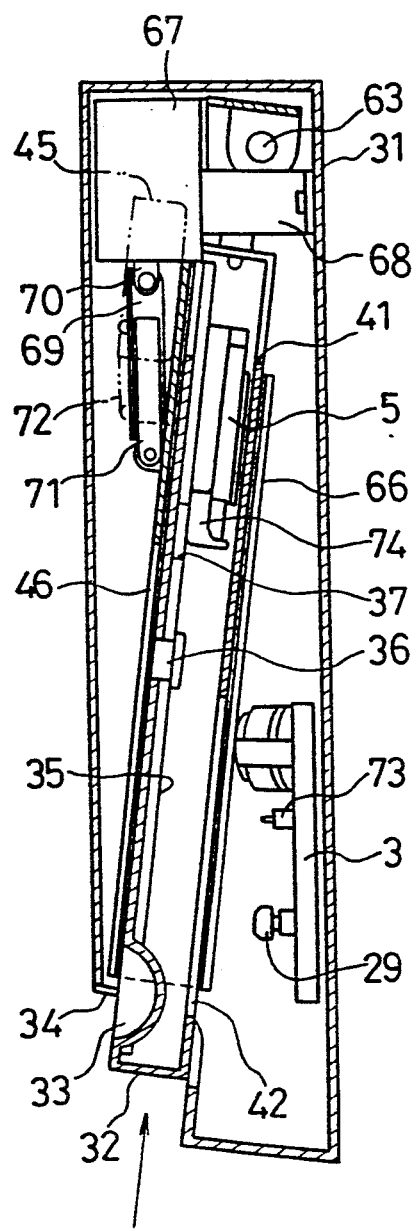
FIG. 7 is a vertical side view showing a state in which the magazine is mounted on an apparatus body.
Figure 8:
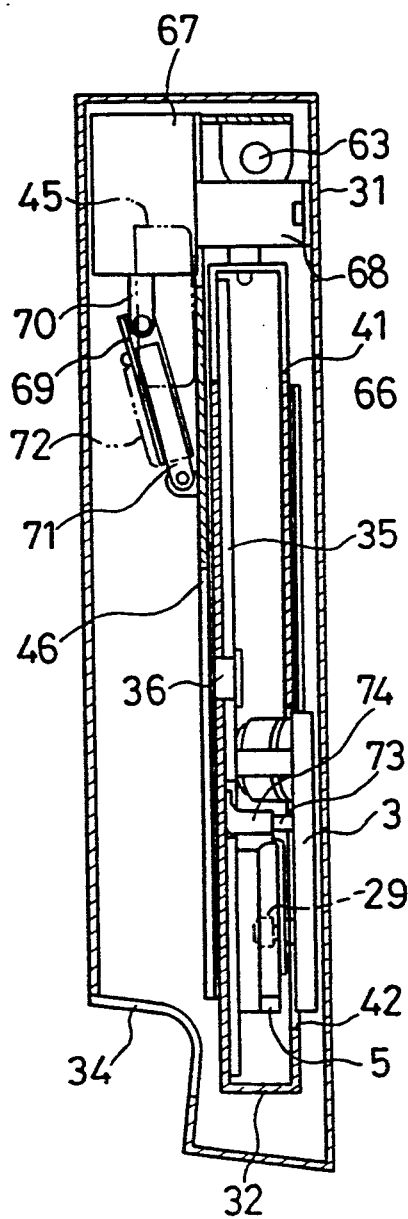
FIG. 8 is a vertical side view showing a state in which the cassette is mounted on a deck by the swinging base.

FIG. 7 is a vertical side view showing a state in which the magazine 32 is mounted on the apparatus body 31. In FIG. 7, reference numeral 73 designates a reference pin provided on a deck 3 and reference numeral 74 designates an open-close frame pivotally attached on the cassette 5.

Next, operation thereof will be described.

Figure 9:
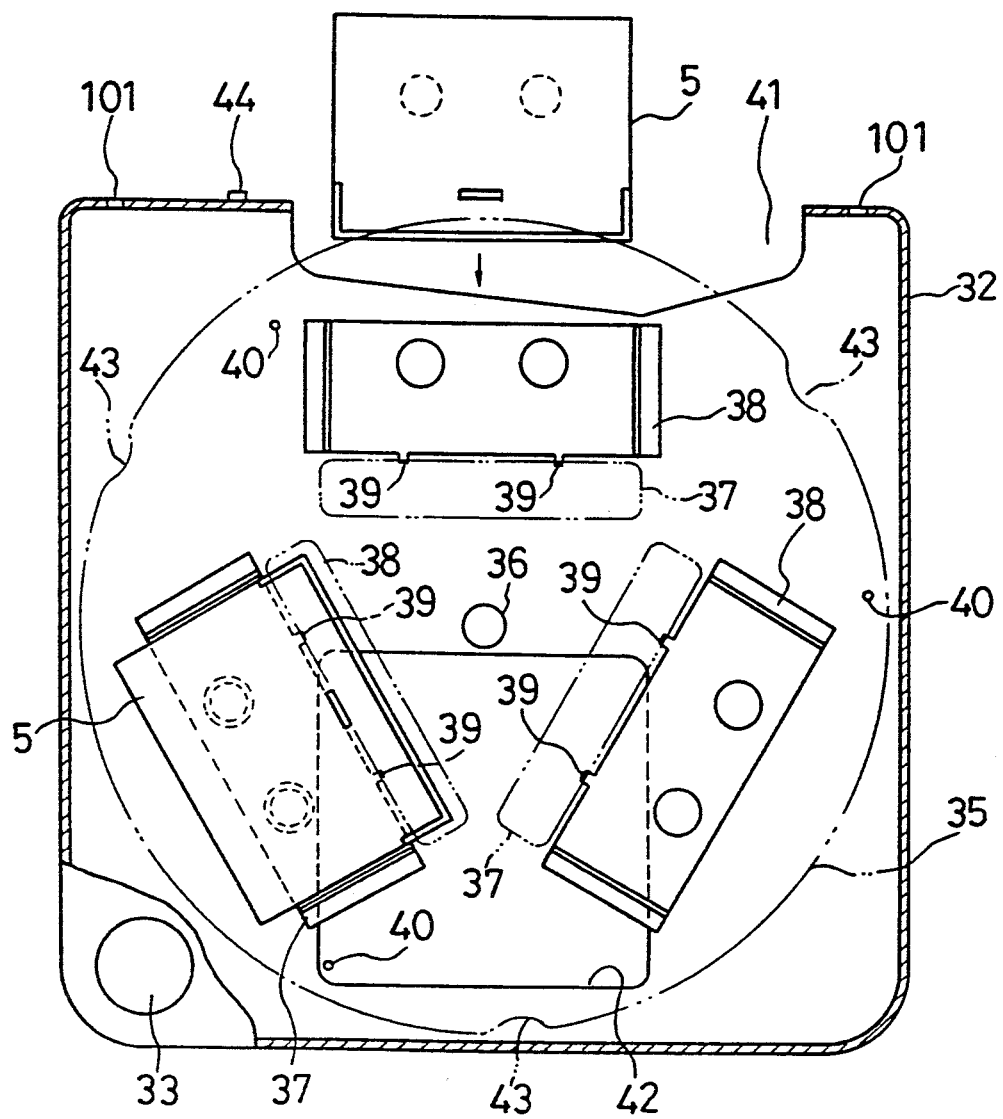
FIG. 9 is a plan view showing a method for mounting the cassette on the magazine.

FIG. 9 is a plan view showing a method for mounting the cassette 5 on the magazine 32. First, the magazine 32 is taken out of the apparatus body 31 and then the first cassette 5 is inserted from the cut off part 41 along the cassette holder 38 in a direction shown by an arrow in FIG. 9 to a position of the stopper 39. Then, the turntable 35 is revolved to bring another cassette holder 38 to the position of the cut off part 41 and then another cassette 5 is similarly inserted. Thus, three cassettes 5 are mounted as shown in FIG. 2.

When the cassettes 5 are all mounted, the magazine is inserted in a direction shown by an arrow in FIG. 7 until the hole part 101 is fitted in the reference pin 102 and then the projection 44 pushes the switch 62 and turns it ON. Thus, the magazine 32 is mounted in the apparatus body 31 as shown by a vertical side view in FIG. 7. In addition, the magazine 32 and the swinging base 46 in this state is shown by a plan view in FIG. 10.

Figure 10:
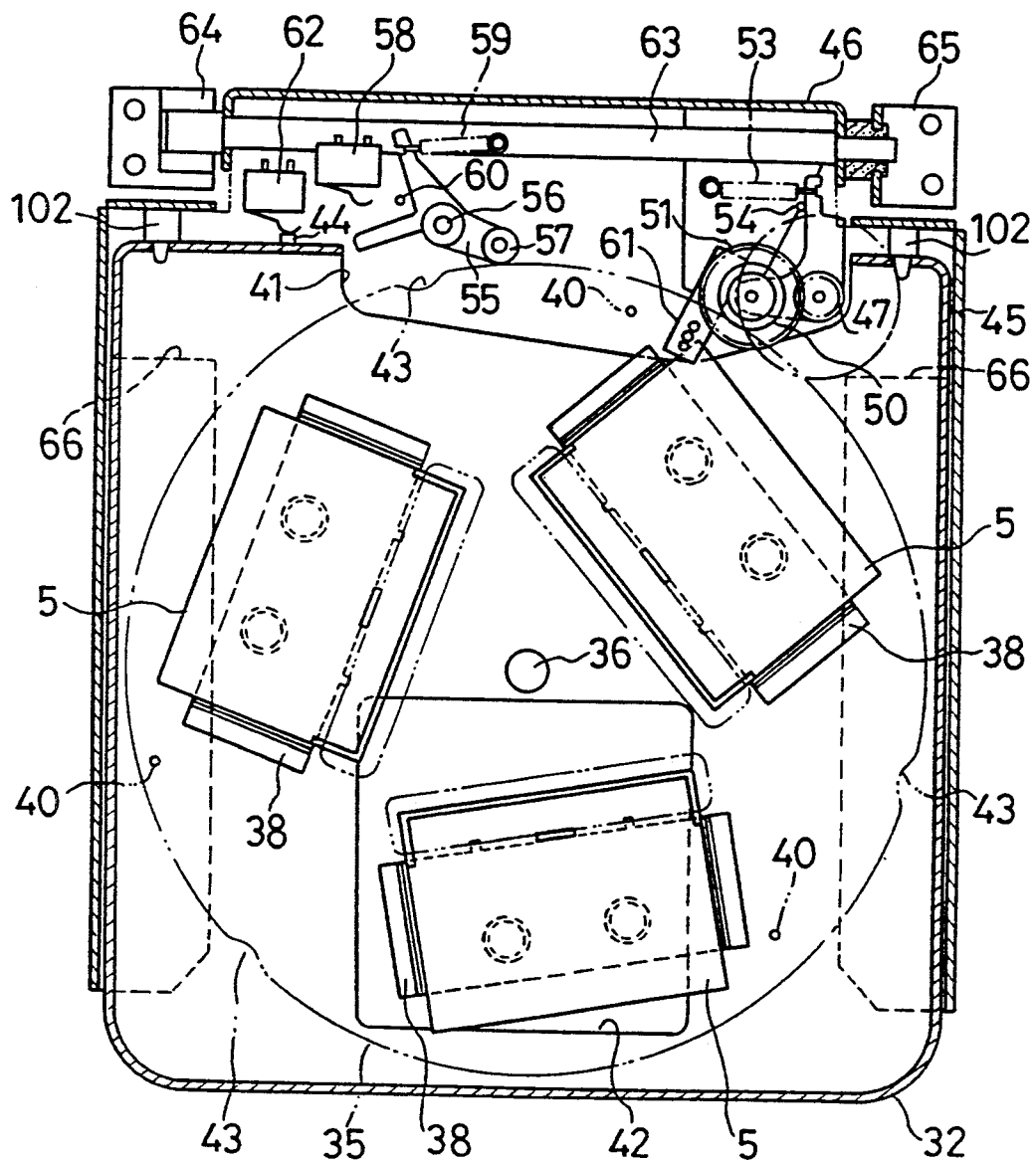
FIG. 10 is a detailed plan view showing a state in which the magazine is mounted but a cassette to be played is not yet selected.

FIG. 10 is a plan view showing a state in which the cassette 5 to be played is not selected yet. The idler 50 of the rotor 52 is pushed by the upper part of the outer peripheral surface of the turntable 35 and then the lever 48 pivots clockwise against the spring 53 and detaches itself from the stopper 54, so that force by the spring 53 all serves as force for pressing the idler 50 to the outer peripheral surface of the turntable 35. The roller 57 of the position detecting lever 55 is pushed by the outer peripheral surface of the turntable 35. Then, the position detecting lever 55 pivots counterclockwise against the spring 59 and then detaches itself from the stopper 60, when the switch 58 is OFF. In addition, the swinging base 46 is lifted until a position where the magazine 32 does not interfere with a reel rest 29 as shown in FIG. 7.

Figure 11:
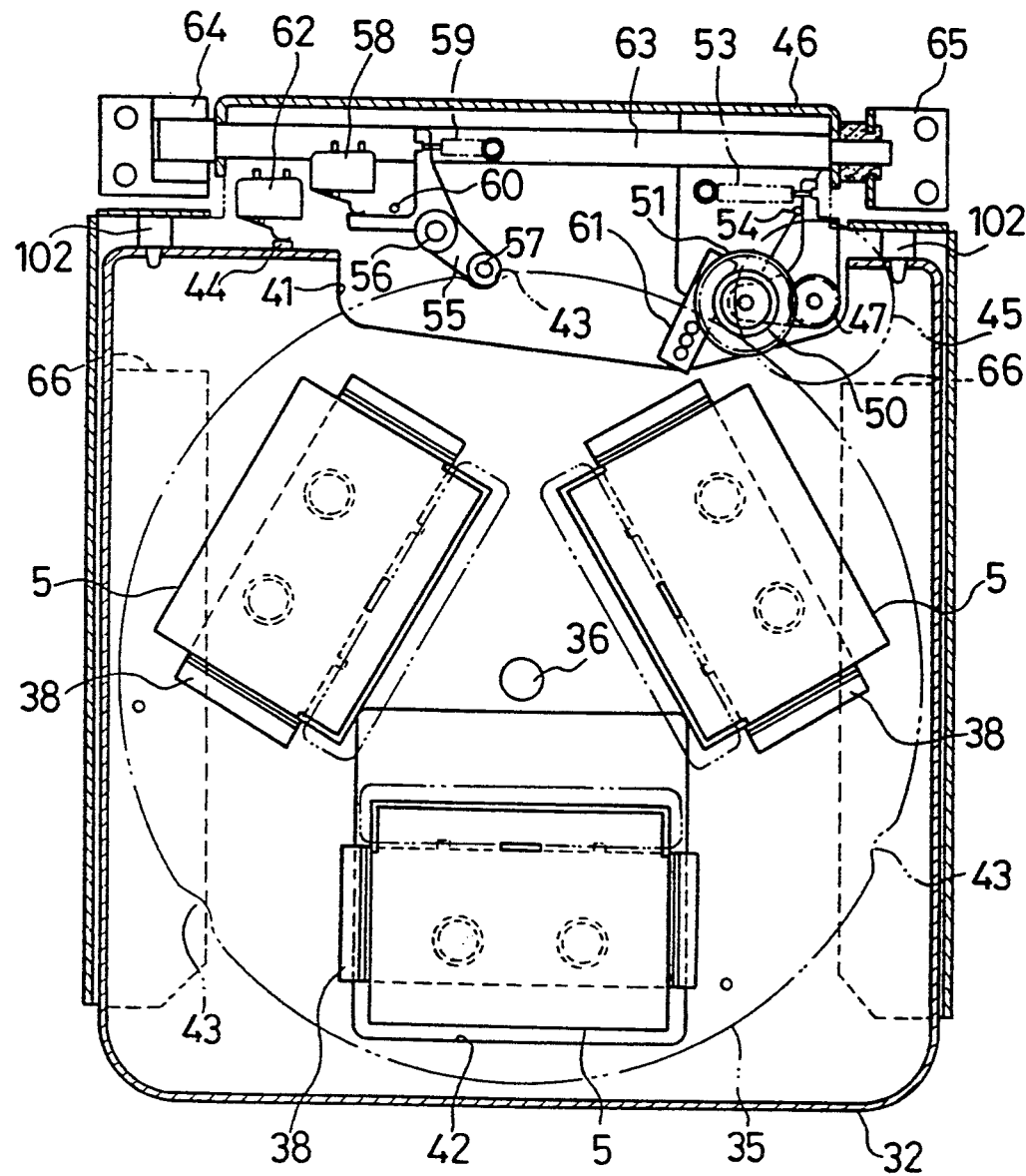
FIG. 11 is a detailed plan view showing a state in which the cassette to be played is selected.

FIG. 11 is a plan view showing a state in which the cassette to be played is selected. When the cassette 5 to be played is selected through an operation key (not shown), the motor 45 is rotated and then the turntable 35 is revolved through the gear 47 and the rotor 52. Then, the roller 57 of the position detecting lever 55 is engaged with the concave part 43 and the switch 58 is turned ON. At this time, the motor 45 is stopped if the photoelectric switch 61 for the cassette 5 to be played is ON but the motor 45 continues to rotate if the switch if OFF and the same determination is made at the next concave part 43.

As described above, when the cassette 5 to be played is selected, an electric power is supplied to the plunger solenoid 67 and the movable part 70 extends and pushes the swinging base 46 down. When the cassette 5 abuts on the reference pin 73, the second connection bar 71 is stopped, but the first connection bar 69 still slides. Therefore, the cassette 5 in the deck 3 is pressed by the tension spring 72 and then the open-close frame 74 is opened by an open-close mechanism (not shown) provided in the deck 3. As a result, the cassette 5 can be prepared for playing as shown in the vertical side view in FIG. 8.

When another cassette is selected next, an electric supply to the plunger solenoid 67 is stopped and the movable part 70 is brought back. Then, the swinging base 46 pivots until a position where the reel rest 29 does not interfere with the magazine 32, which is shown in FIG. 7. Then, the motor 45 is rotated and the next cassette 5 is selected.

Figure 12:
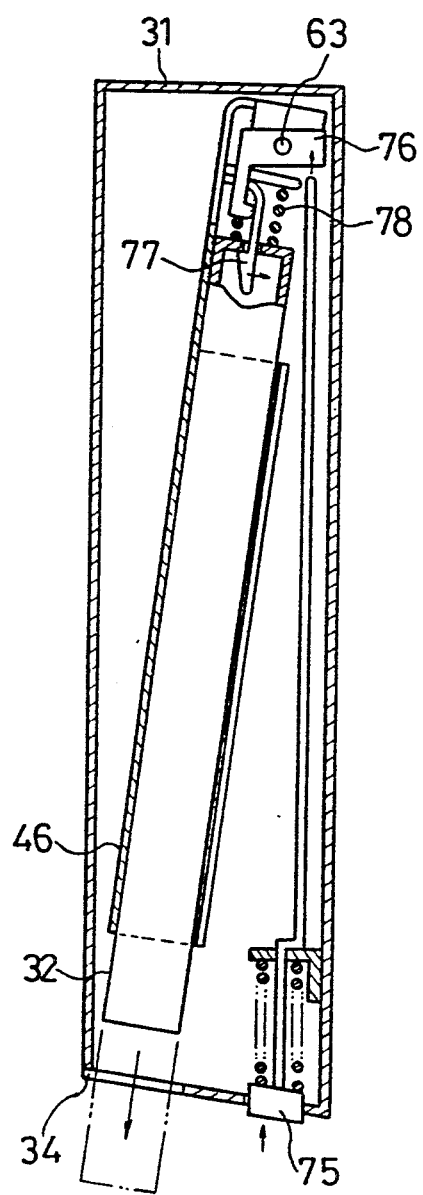
FIGS. 12 and 13 are vertical side views showing second and a third embodiments of the present invention.

In addition, although one end of the magazine 32 is outside the front opening 34 when the swinging base 46 is lifted up from the deck 3 and then a user draws out the magazine 32 by pulling out the claw 33 by a finger in the above embodiment, there may be provided a mechanism in which an eject button 75 provided on the apparatus body 31 is pushed, as in a second embodiment of the present invention in FIG. 12. When an arm 76 pivots, engagement of the hook 77 with the magazine 32 is relieved and then the magazine 32 is pushed outside the front opening 34 by force of a compression spring 78.

Figure 13:
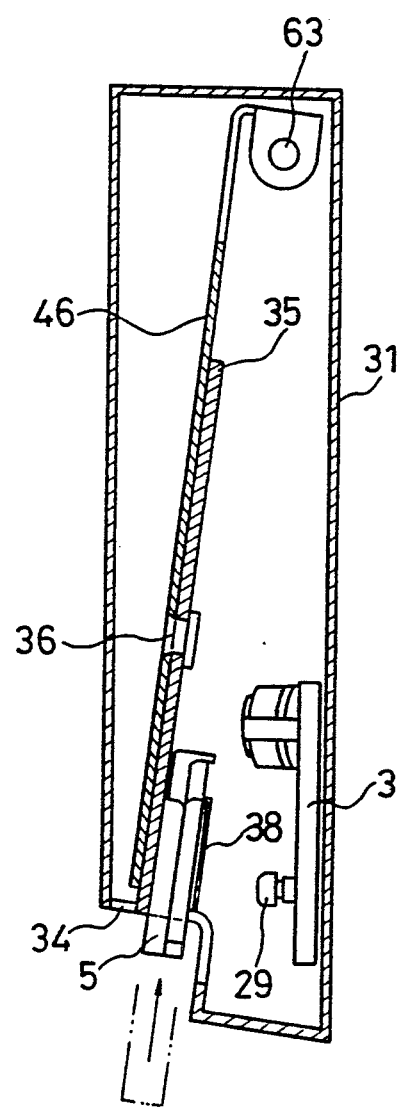
Figure 14:
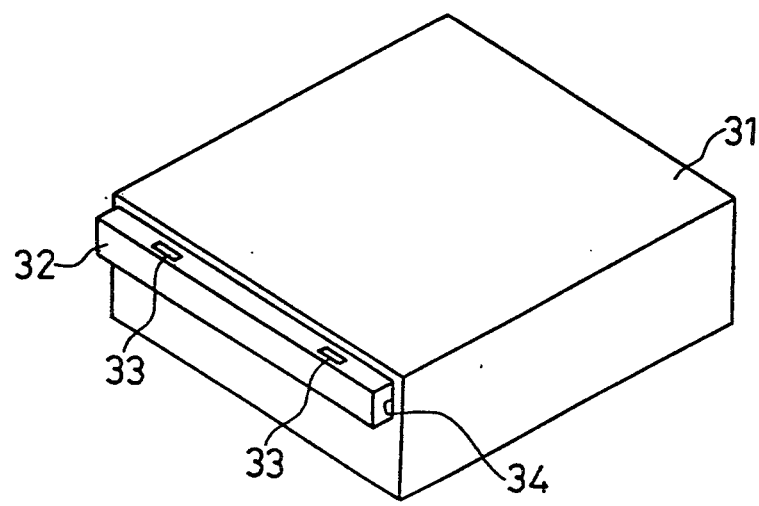
FIG. 14 is a perspective view showing an automatic cassette tape recording and reproducing apparatus in accordance with a fourth embodiment of the present invention.

Although the swinging base 46 and the magazine 32 can be separated in the above embodiment, the turntable 35 may be rotatably and directly mounted on the swinging base 46 and when the cassette holder 38 pivoted by the motor 45 stops at the center of the front opening 34, the cassette 5 may be directly inserted into the cassette holder 38 at the front opening 34 as in a third embodiment of the present invention, as shown in FIG. 13. In the case, the same effect as in the above embodiment can be obtained.

FIGS. 14 to 24 are perspective views showing an automatic cassette tape recording and reproducing apparatus in accordance with a fourth embodiment of the present invention. In figures, reference numeral 31 designates an apparatus body, reference numeral 32 designates a magazine on which a claw 33 is provided in order to easily mount or dismount the magazine 32 on or from the apparatus body 31.

Figure 15:
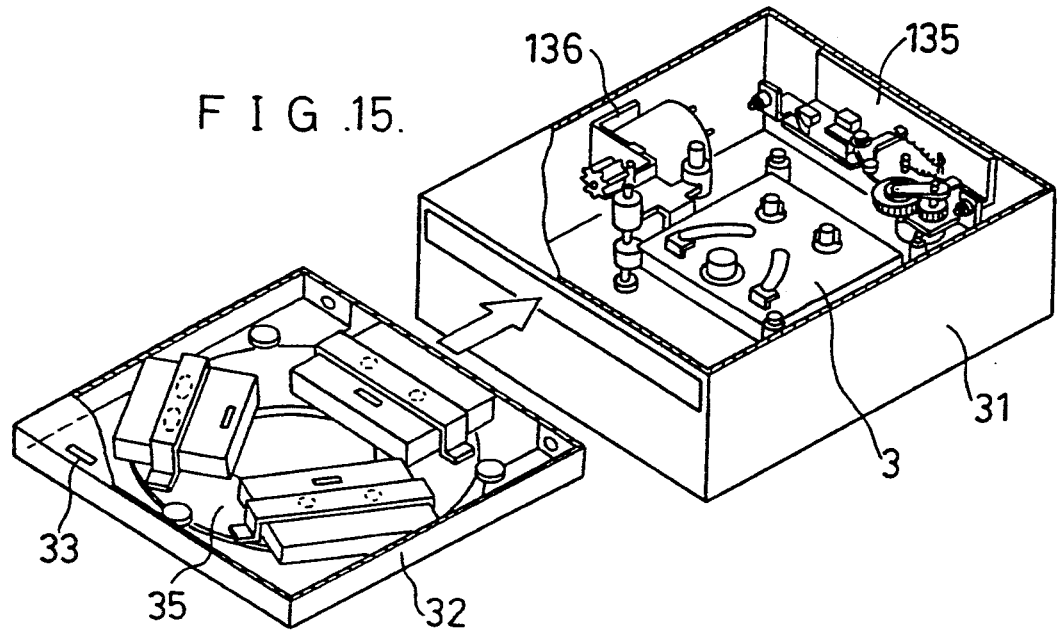
FIG. 15 is a perspective view showing the inside of an apparatus body and a magazine shown in FIG. 14 in which the magazine is taken out of the apparatus body.

FIG. 15 is a perspective view showing the inside of the apparatus body 31 and the magazine 32 which is taken out of the apparatus body 31. In FIG. 15, reference numeral 35 designates a turntable provided in the magazine 32, reference numeral 135 designates a turntable revolving mechanism for the turntable 35, which is provided in the apparatus body 31 and reference numeral 136 designates a vertical driving mechanism for a deck 3.

Figure 16:
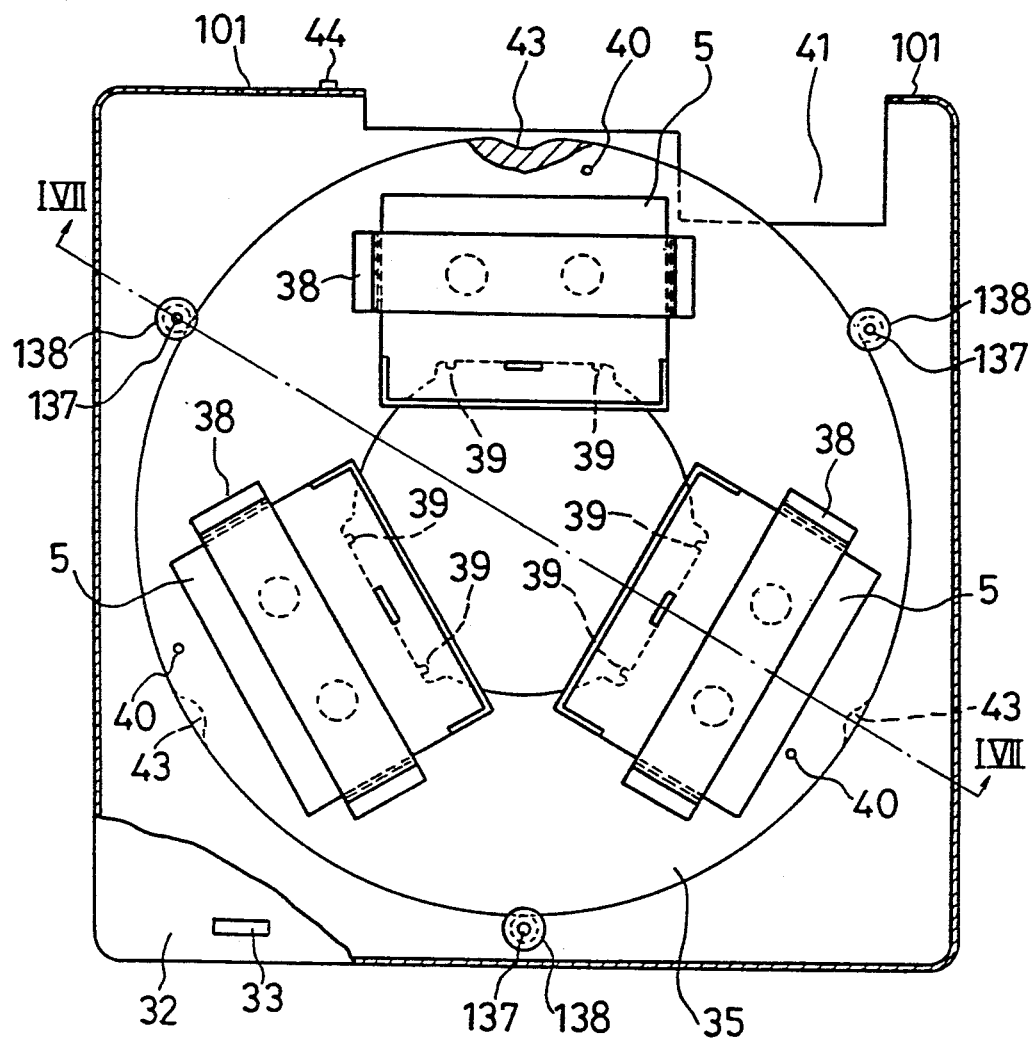
FIG. 16 is a plan view showing the inside of the magazine shown in FIG. 15 in detail.
Figure 17:
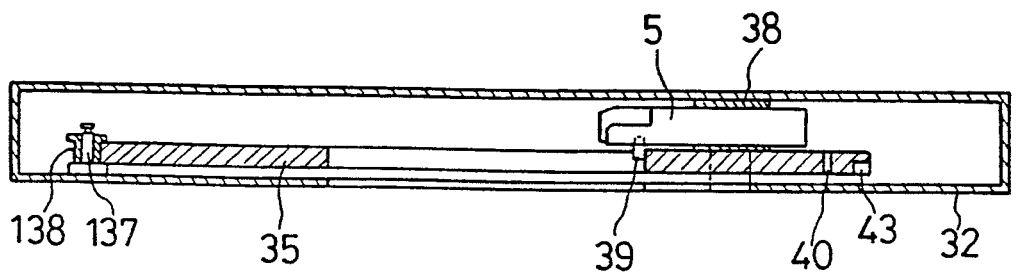
FIG. 17 is a sectional view taken along a line I VII—I VII in FIG. 18.

FIG. 16 is a plan view showing the inside of the magazine 32 in detail and FIG. 17 is a sectional view taken along a line I VII—I VII in FIG. 16. The turntable 35 can be revolved in a peripheral direction and controlled in vertical and radial directions by the roller 138 rotatable around the shaft 137 fixed on the magazine 32. A plurality of cassette holders 38 are provided on the turntable 35, which guide the cassette 5 into its inserted direction and control the movement of the cassette 5 in the vertical direction thereof. Reference numeral 39 designates a stopper provided on the turntable 35, which determines a position of the cassette 5 in its inserted direction. Reference numeral 40 designate identification holes provided in the turntable 35 to identify the plurality of cassettes 5 which are identified by a distance between the revolving center of the turntable 35 and the identification holes 40. Reference numeral 41 designates a cut off part provided for insertion of the cassette 5 and of the turntable revolving mechanism in a state where the magazine 32 is mounted on the apparatus body 31. Reference numeral 43 designates a concave part provided at a lower part of an outer peripheral surface of the turntable 35. Reference numeral 44 designates a projection provided at an outer edge of the magazine 32 and reference numeral 101 designates a hole part.

Figure 18:
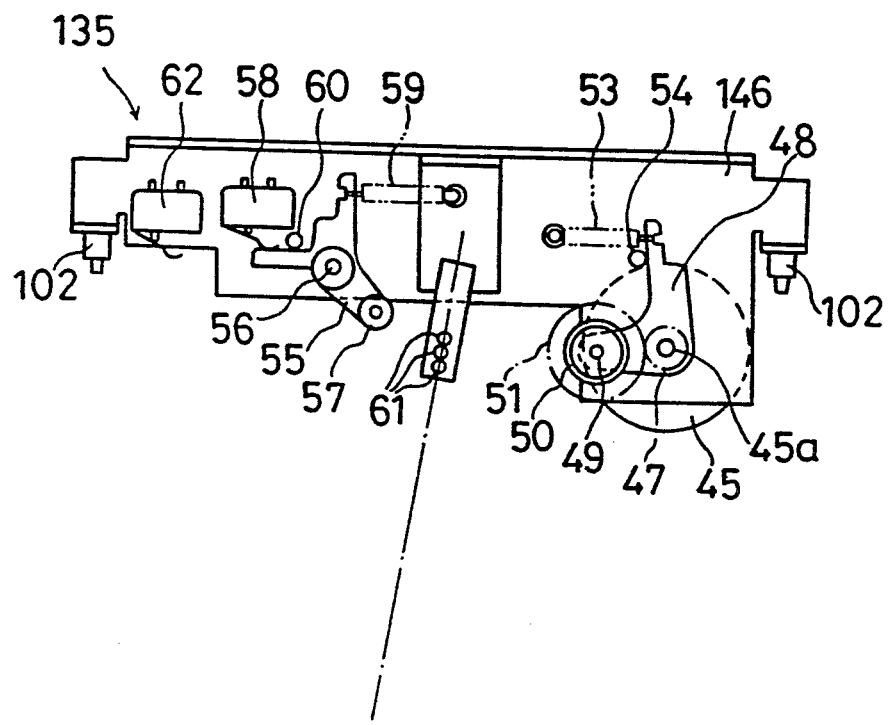
FIG. 18 is a plan view showing a turntable revolving mechanism shown in FIG. 15 in detail.
Figure 19:
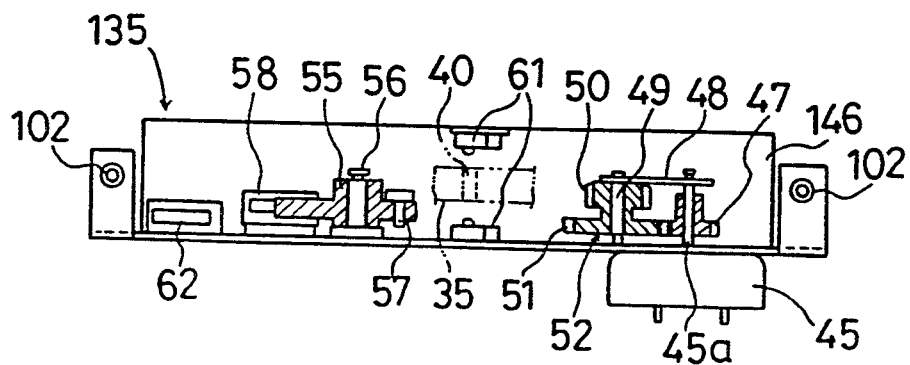
FIG. 19 is a partially vertical front view of FIG. 18.

FIG. 18 is a plan view showing the turntable revolving mechanism 135 in detail and FIG. 19 is a partially vertical front view of FIG. 18. In FIGS. 18 and 19, reference numeral 45 designates a motor for revolving the turntable 35 which is fixed on a subbase 146. A gear 47 is fixed on an axis 45a of the motor 45 and a lever 48 capable of swinging around the axis 45a is fitted therein. A shaft 49 is fixed on the lever 48. There is provided a rotor 52 rotating around this shaft 49. The rotor 52 comprises an idler 50 at an upper part, having an outer peripheral surface formed of a material with a large friction coefficient such as an elastic body and capable of being in contact with an upper part of the outer peripheral surface of the turntable 35, and a gear part 51 engaged with the gear 47 at a lower part. The lever 48 is forced counterclockwise around the axis 45a of the motor 45 by force of a spring 53, which force by the spring 53 is set so as to be able to sufficiently transfer driving force of the motor 45 when the idler 50 is pressed to the outer peripheral surface of the turntable 35. Reference numeral 54 designates a stopper of the lever 48 while the magazine 32 is not mounted. Reference numeral 55 designates a position detecting lever for positioning the cassette 5 on the turntable 35 in the rotating direction thereof, which lever is rotatable around a shaft 56 fixed on the subbase 146. The position detecting lever 55 comprises a roller 57 positioned so as to be engaged with the concave part 43 provided at the lower part of the outer peripheral surface of the turntable 35. A switch 58 detects whether the roller 57 is engaged with the concave part 43 or on the outer peripheral surface of the turntable 35. The position detecting lever 55 is forced clockwise around the shaft 56 by a spring 59. Reference numeral 60 designates a stopper of the position detecting lever 55 while the magazine 32 is not mounted. Force by the spring 59 is set such that the roller 57 can be urged out of the concave part 43 onto the outer peripheral surface of the turntable 35 by the revolving force of the turntable 35. Reference numeral 61 designates a photoelectric switch for identifying the plurality of cassettes 5 and it is provided corresponding to each of the identification holes 40 on the turntable 35. Each photoelectric switch 61 is arranged on a straight line crossing the revolving center of the turntable 35 in such a manner that any one of the identification holes 40 coincides with the position of the photoelectric switch 61 when the roller 57 is engaged with the concave part 43. Reference numeral 102 designates a reference pin for determining an inserting end position of the magazine 32 in the apparatus body 31, which can be engaged with the hole part 101 of the magazine 32. Reference numeral 62 designates a switch which can be engaged with the projection 44 of the magazine 32 when the reference pin 102 is engaged with the hole part 101.

Figure 20:
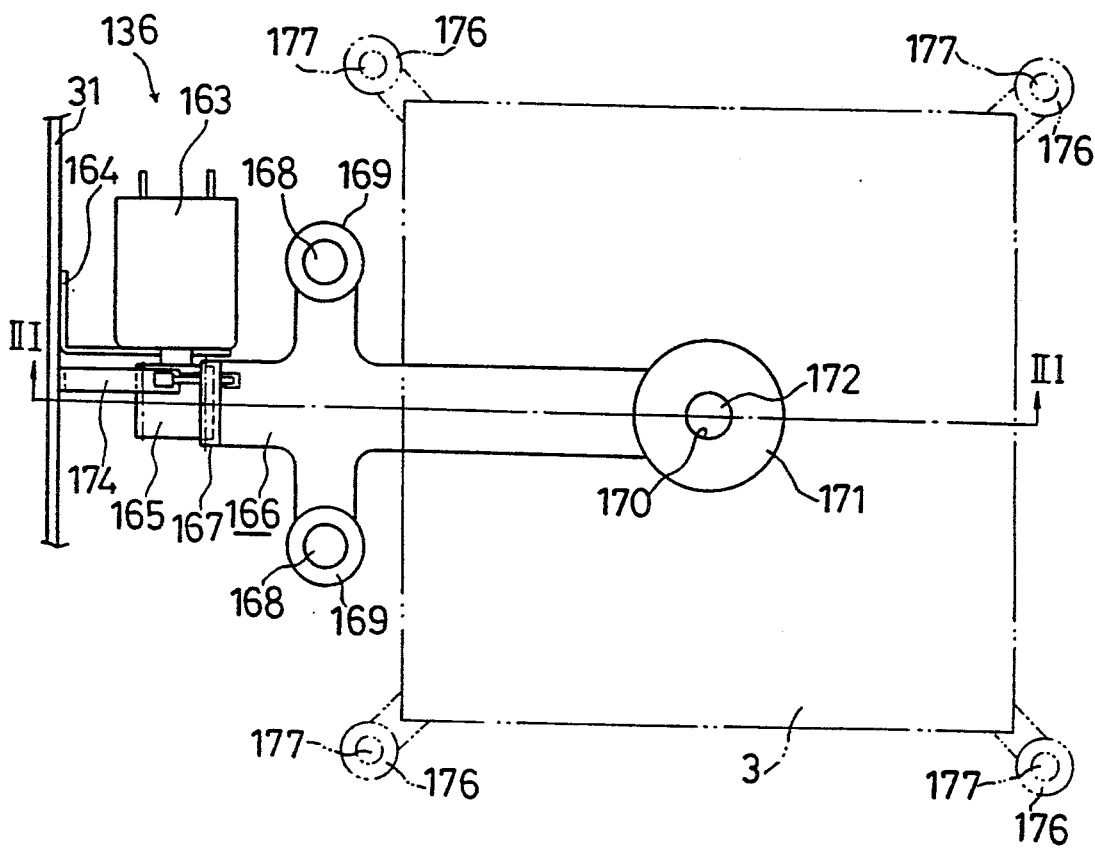
FIG. 20 is a plan view showing a vertical driving mechanism for a deck shown in FIG. 15 in detail.
Figure 21:
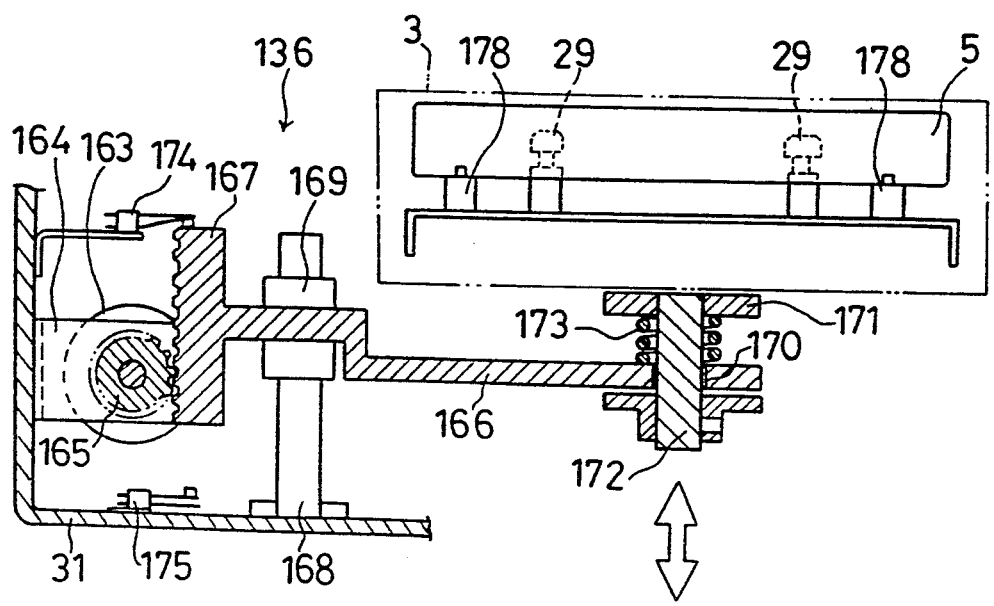
FIG. 21 is a sectional view taken along a line II I—II I in FIG. 20.

FIG. 20 is a plan view showing a vertical driving mechanism 136 for a deck 3 in detail and FIG. 21 is a sectional view taken along a line III—III I in FIG. 20.

In FIGS. 20 and 21, reference numeral 163 designates a motor for vertically moving the deck 3, which is fixed on the apparatus body 31 by a holder 164 and a gear 165 is fixed on the axis. Reference numeral 166 designates a lever having a rack 167 engaged with the gear 165 at its one end and bearings 169 at its middle sides, which are fitted in both posts 168 fixed in the apparatus body 31 so as to be vertically moved. The lever 166 can be only vertically moved along the both posts 168. The lever 166 also comprises a hole 170 provided at the other end thereof, in which a shaft part 172 of a pressing element 171 for pushing up the deck 3 is fitted. The pressing element 171 can be moved only in a vertical direction and forced upward from the lever 166 by the compression spring 173. Reference numerals 174 and 175 designate switches for detecting a range of vertical movement of the lever 166 and reference numeral 176 designates a bearing fixed in each of four corners of the deck 3, which is fitted in each of the four shafts 177 fixed on the apparatus body so as to be vertically moved. The deck 3 can be moved only in the vertical direction along the four shafts 177. Reference numeral 178 designates a reference pin fixed on the deck 3 for positioning the cassette 5.

Next, operation thereof will be described.

Figure 22:
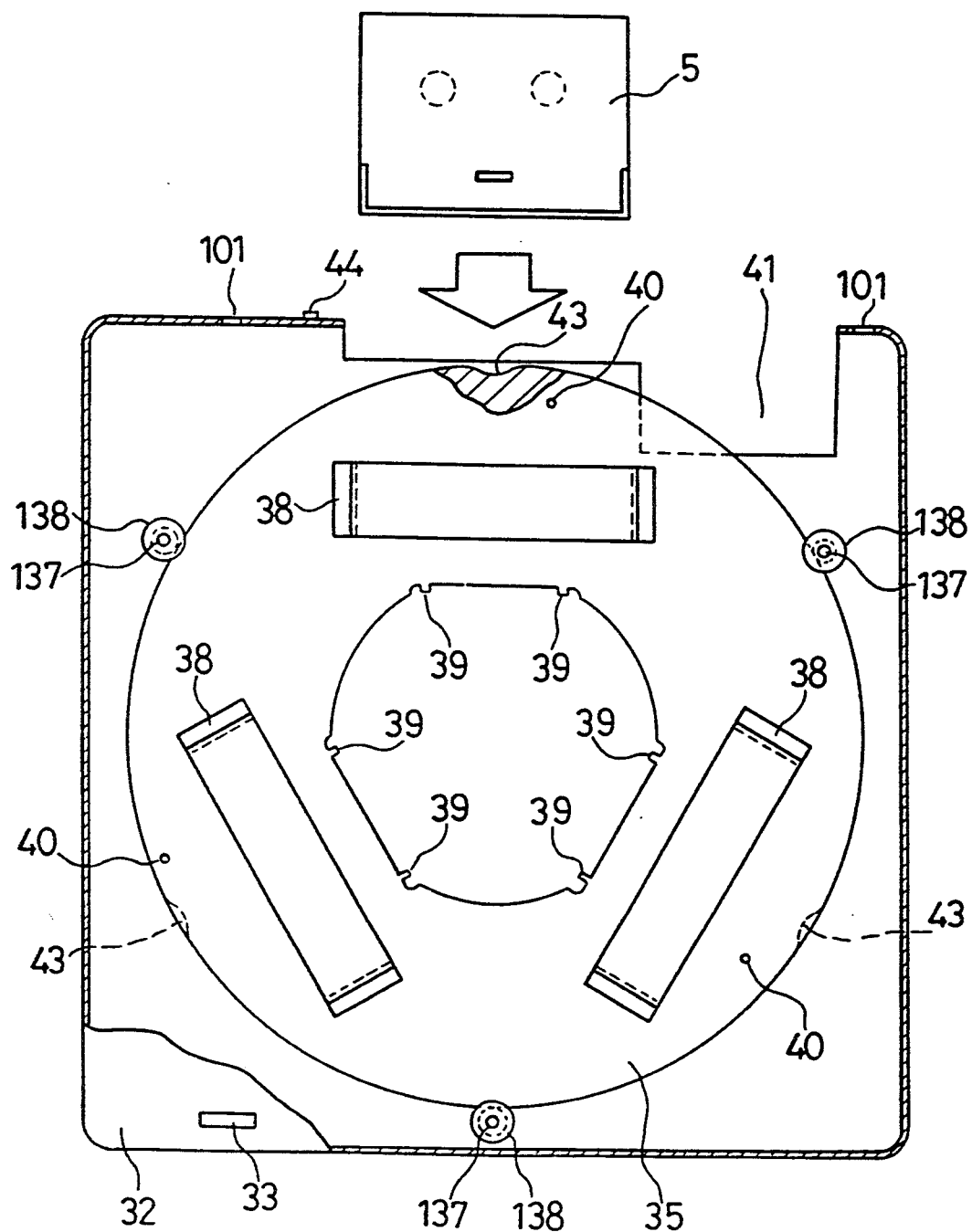
FIG. 22 is a plan view showing a method for mounting a cassette on the magazine in the fourth embodiment of the present invention.
Figure 26:
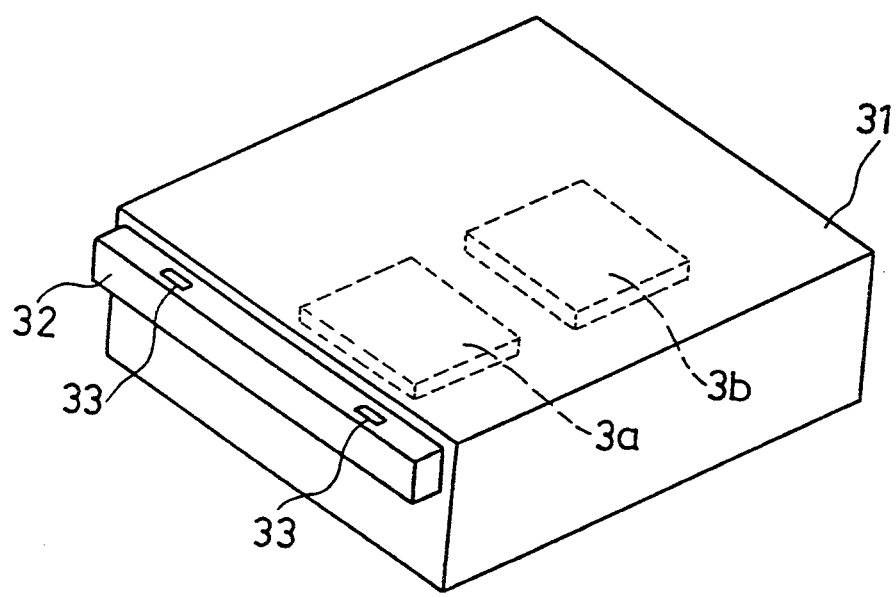
FIG. 26 is a perspective view showing an automatic cassette tape recording and reproducing apparatus in accordance with a sixth embodiment of the present invention.

FIG. 22 is a plan view showing a method for mounting the cassette 5 on the magazine 32. First, the magazine 32 is taken out of the apparatus body 31 and then the first cassette 5 is inserted through the cut off part 41 into the cassette holder 38 in a direction shown by the arrow in FIG. 22 the a position of the stopper 39. Then, the turntable 35 is revolved to bring another cassette holder 38 to the position of the cut off part 41 and then another cassette 5 is similarly inserted. Thus, three cassettes 5 are mounted as shown in FIG. 16.

When the cassettes 5 are all mounted, the magazine 32 is inserted in a direction shown by an arrow in FIG. 15 until the hole part 101 is fitted in the reference pin 102 and then the projection 44 pushes the switch 62 and turns it ON.

FIG. 23 is a plan view showing a state in which the cassette 5 to be played in not yet selected after the magazine 32 is mounted. The idler 50 of the rotor 52 is pushed to the upper part of the outer peripheral surface of the turntable 35 and the lever 48 pivots clockwise against the spring 53 and then detaches itself from the stopper 54, so that force by the spring 53 is all used for pressing the idler 50 to the outer peripheral surface of the turntable 35. The roller 57 of the position detecting lever 55 is pushed by the lower part (except for the concave part 43) of the outer peripheral surface of the turntable 35. Then, the position detecting lever 55 pivots counterclockwise against the spring 59 and then detaches itself from the stopper 60, when the switch 58 is OFF. The deck 3 is lowered to a position in which the reel rest 29 does not interfere with the magazine 32 and it is at rest while the switch 175 is ON.

FIG. 24 is a plan view showing a state in which the cassette 5 to be played is selected. When the cassette to be played is selected through the operation key (not shown), the motor 45 is rotated and then the turntable 35 is revolved through the gear 47 and the rotor 52. Then, when the roller 57 of the position detecting lever 55 is engaged with the concave part 43 of the turntable 35, the switch 58 is turned ON. At this time, if the photoelectric switch 61 for the cassette 5 to be played is ON, the motor 45 is stopped but if it is OFF, the motor 45 is still rotated and then the same determination is made at the next concave part 43.

As described above, when the cassette 5 to be played is selected, the motor 163 is rotated and then the lever 166 is moved upward to push up the deck 3. When the cassette 5 comes in contact with the reference pin 178, the pressing element 171 is stopped but the lever 166 is still moved upward. Therefore, the deck 3 is pressed to the cassette 5 by the compression spring 173 and when the switch 174 is turned ON, the motor 163 is stopped. Thus, the cassette 5 can be prepared for playing. When another cassette 5 is selected next, the motor 163 is rotated first and the lever 166 is lowered. Then, the deck 3 is lowered to a position in which the reel rest 29 does not interfere with the magazine 32. When the switch 175 is turned ON, the motor 163 is stopped and then the motor 45 is rotated. Thus, the next cassette 5 is selected.

Although the vertical driving mechanism 136 for vertically driving the deck 3 is used as the deck driving mechanism which mounts the selected cassette 5 on the deck 3 in the above embodiment of the present invention, a mechanism which swings the deck 3 around the supporting shaft 79 thereby to vertically move it may be used as in a fifth embodiment of the present invention in FIG. 25.

FIGS. 26 to 36 are perspective views showing an automatic cassette tape recording and reproducing apparatus in accordance with a sixth embodiment of the present invention. In the figures, reference numeral 31 designates an apparatus body, reference numeral 32 designates a magazine on which a claw 33 is provided in order to easily mount or dismount the magazine 32 on or from the apparatus body 31. Reference numerals 3a and 3b designate recording and reproducing decks I and II.

Figure 27:
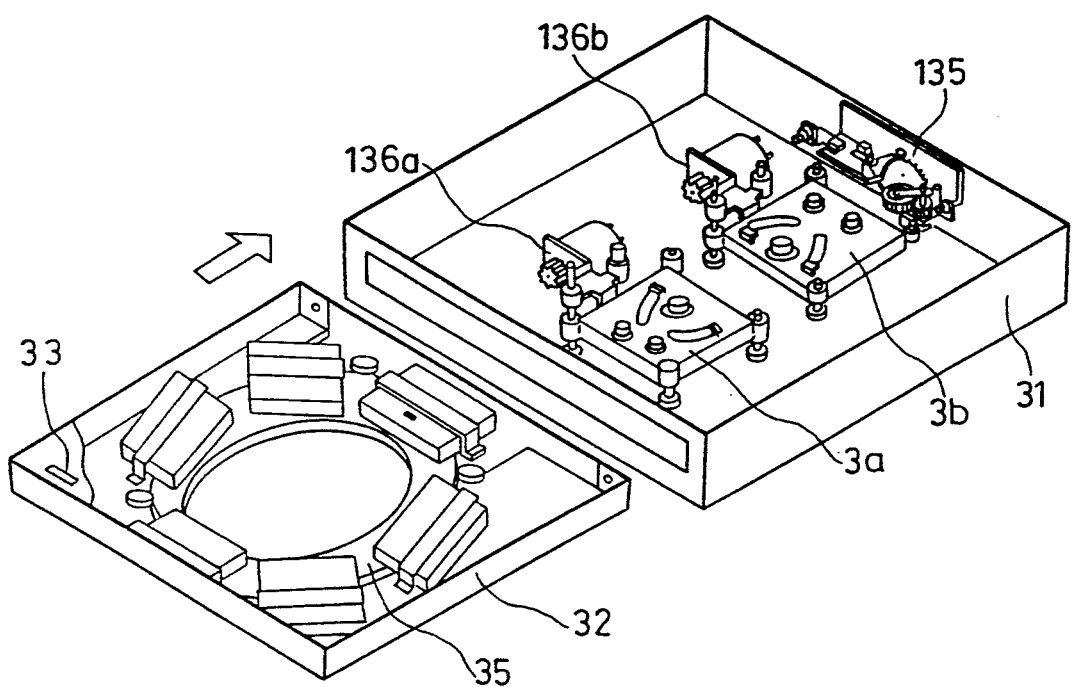
FIG. 27 is a perspective view showing the inside of an apparatus body and a magazine shown in FIG. 26 in which the magazine is taken out of the apparatus body.

FIG. 27 is a perspective view showing the inside of the apparatus body 31 and the magazine 32 which is taken out of the apparatus body 31. In FIG. 27, reference numeral 35 designates a turntable provided in the magazine 32. Reference numeral 135 designates a turntable revolving mechanism for revolving the turntable 35, which is provided in the apparatus body 31 and reference numeral 136a and 136b designate vertical driving mechanisms for the decks 3a and 3b.

Figure 29:
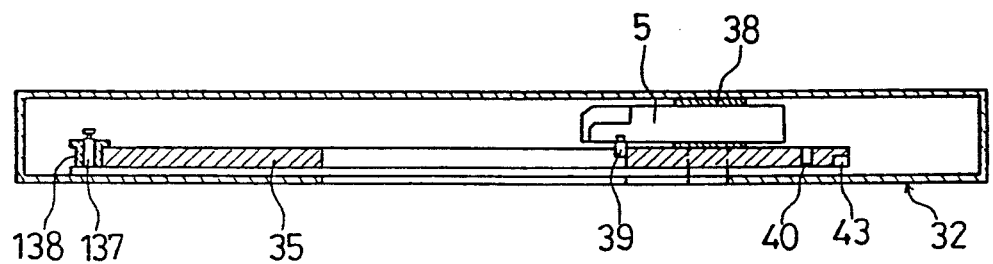
FIG. 29 is a sectional view taken along a line II IX—II IX in FIG. 28.
Figure 28:
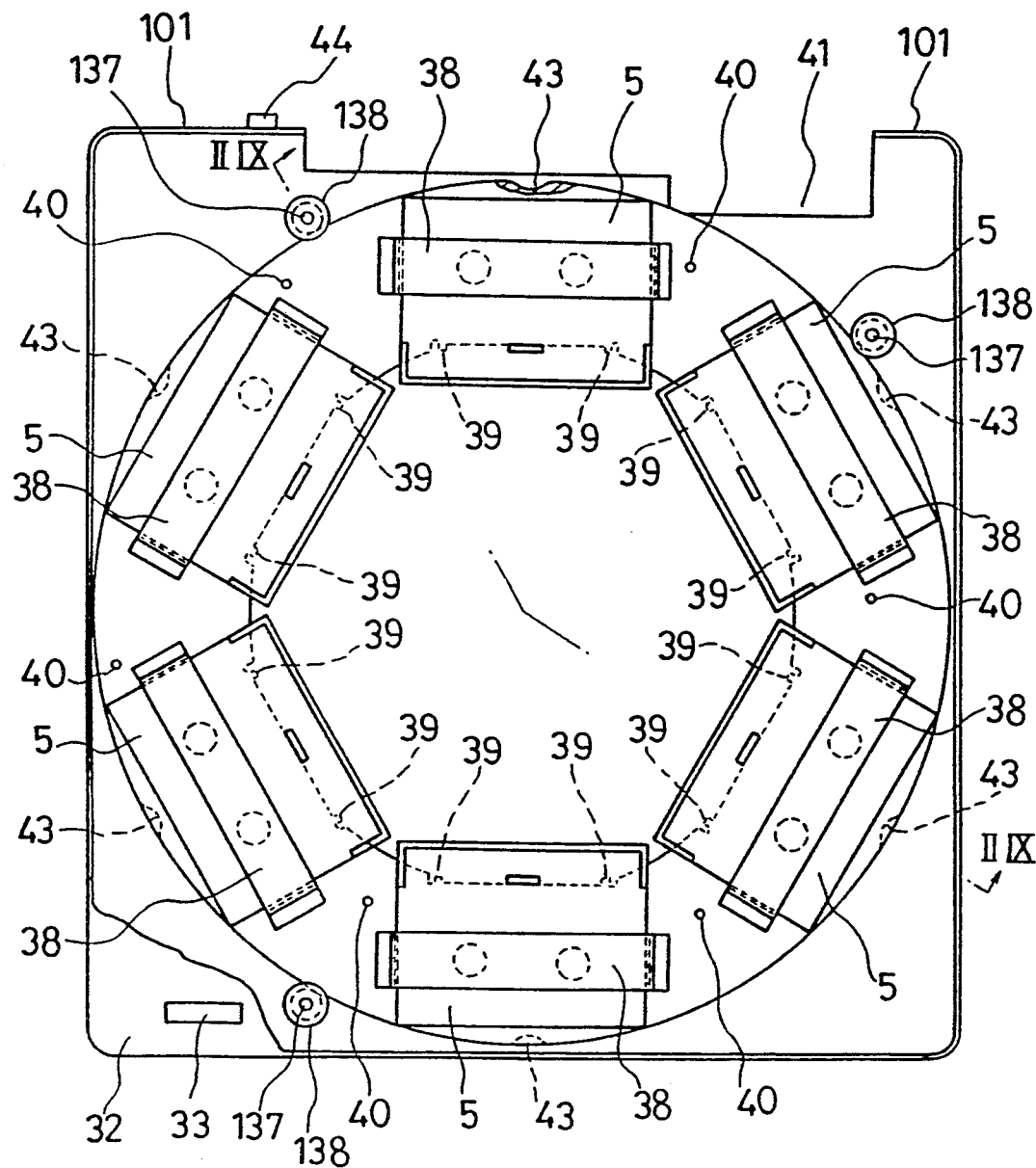
FIG. 28 is a plan view showing the inside of the magazine shown in FIG. 27 in detail.

FIG. 28 is a plan view showing the inside of the magazine 32 in detail and FIG. 29 is a sectional view taken along a line II IX—II IX in FIG. 28. The turntable 35 can be revolved in a peripheral direction and controlled in vertical and radial directions by the roller 138 rotatable around the shaft 137 fixed on the magazine 32. A plurality of cassette holders 38 are provided on the turntable 35, which guide the cassette 5 into its inserted direction and control the movement of the cassette 5 in the vertical direction thereof. Reference numeral 39 designate stopper provided on the turntable 35, which determines a position of the cassette 5 in its inserted direction. Reference numeral 40 designate identification holes provided in the turntable 35 to identify the plurality of cassettes 5 which are identified by a distance between the revolving center of the turntable 35 and the identification hole 40. Reference numeral 41 designates a cut off part provided for insertion of the cassette 5 and of the turntable revolving mechanism in a state where the magazine 32 is mounted on the apparatus body 31. Reference numeral 43 designates a concave part provided at a lower part of an outer peripheral surface of the turntable 35. Reference numeral 44 designates a projection provided at an outer edge of the magazine 32 and reference numeral 101 designates a hole part.

Figure 30:
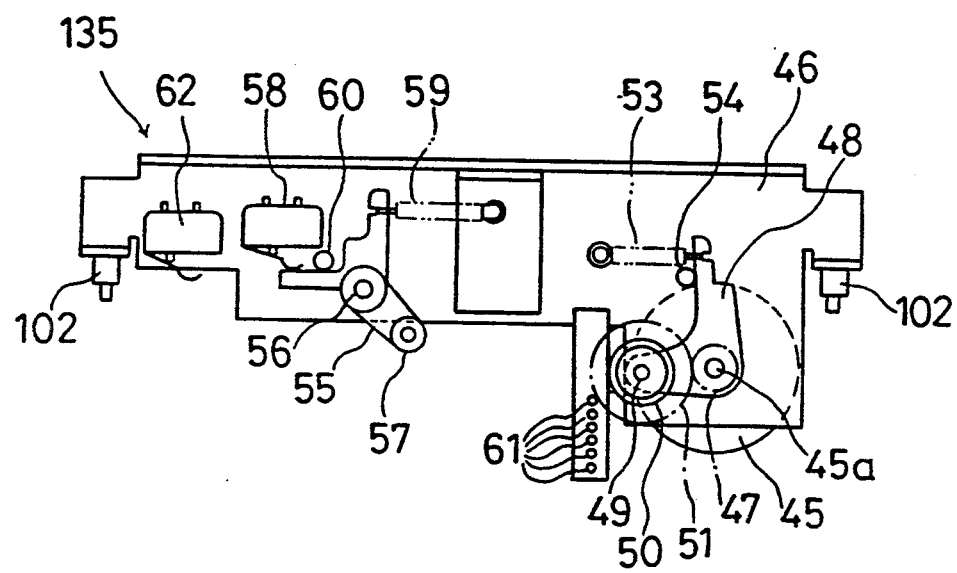
FIG. 30 is a plan view showing a turntable revolving mechanism shown in FIG. 27 in detail.
Figure 31:
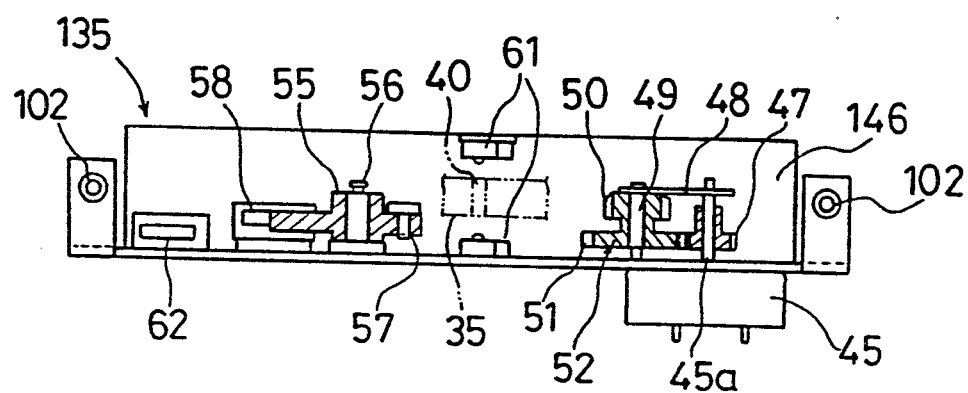
FIG. 31 is a partially vertical front view of FIG. 30.

FIG. 30 is a plan view showing a turntable revolving mechanism 135 in detail and FIG. 31 is a partially vertical front view of FIG. 30. In FIGS. 30 and 31, reference numeral 45 designates a motor for revolving the turntable 35 which is fixed on the subbase 146. A gear 47 is fixed on an axis 45a of the motor 45 and a lever 48 capable of swinging around the axis 45a is fitted therein. A shaft 49 is fixed on the lever 48. There is provided a rotor 52 rotating around this shaft 49. The rotor 52 comprises an idler 50 at an upper part, having an outer peripheral surface formed of a material with a large friction coefficient such as an elastic body and capable of being in contact with an upper part of the outer peripheral surface of the turntable 35, and a gear part 51 engaged with the gear 47 at a lower part. The lever 48 is forced counterclockwise around the axis 45a of the motor 45 by force of a spring 53, which force by the spring 53 is set so as to be able to sufficiently transfer driving force of the motor 45 when the idler 50 is pressed to the outer peripheral surface of the turntable 35. Reference numeral 54 designates a stopper of the lever 48 while the magazine 32 is not mounted. Reference numeral 55 designates a position detecting lever for positioning the cassette 5 on the turntable 35 in the rotation direction thereof, which lever is rotatable around a shaft 56 fixed on the subbase 146.

The position detecting lever 55 comprises a roller 57 positioned so as to be engaged with the concave part 43 provided at the lower part of the outer peripheral surface of the turntable 35. A switch 58 detects whether the roller 57 is engaged with the concave part 43 or on the outer peripheral surface of the turntable 35. The position detecting lever 55 is forced clockwise around the shaft 56 by a spring 59. Reference numeral 60 designates a stopper of the position detecting lever 55 while the magazine is not mounted. Force by the spring 59 is set such that the roller 57 can be urged out of the concave part 43 onto the outer peripheral surface of the turntable 35 by the revolving force of the turntable 35. Reference numeral 61 designates a photoelectric switch for identifying the plurality of cassettes 5 and it is provided corresponding to each of the identification holes 40 on the turntable 35. Each photoelectric switch 61 is arranged on a straight line crossing the revolving center of the turntable 35 in such a manner that any one of the identification holes 40 coincides with the position of the photoelectric switch 61 when the roller 57 is engaged with the concave part 43. Reference numeral 102 designates a reference pin for determining an inserting end position of the magazine 32 in the apparatus body 31, which can be engaged with the hole part 101 of the magazine 32. Reference numeral 62 designates a switch which can be engaged with the projection 44 of the magazine 32 when the reference pin 102 is engaged with the hole part 101.

Figure 32:
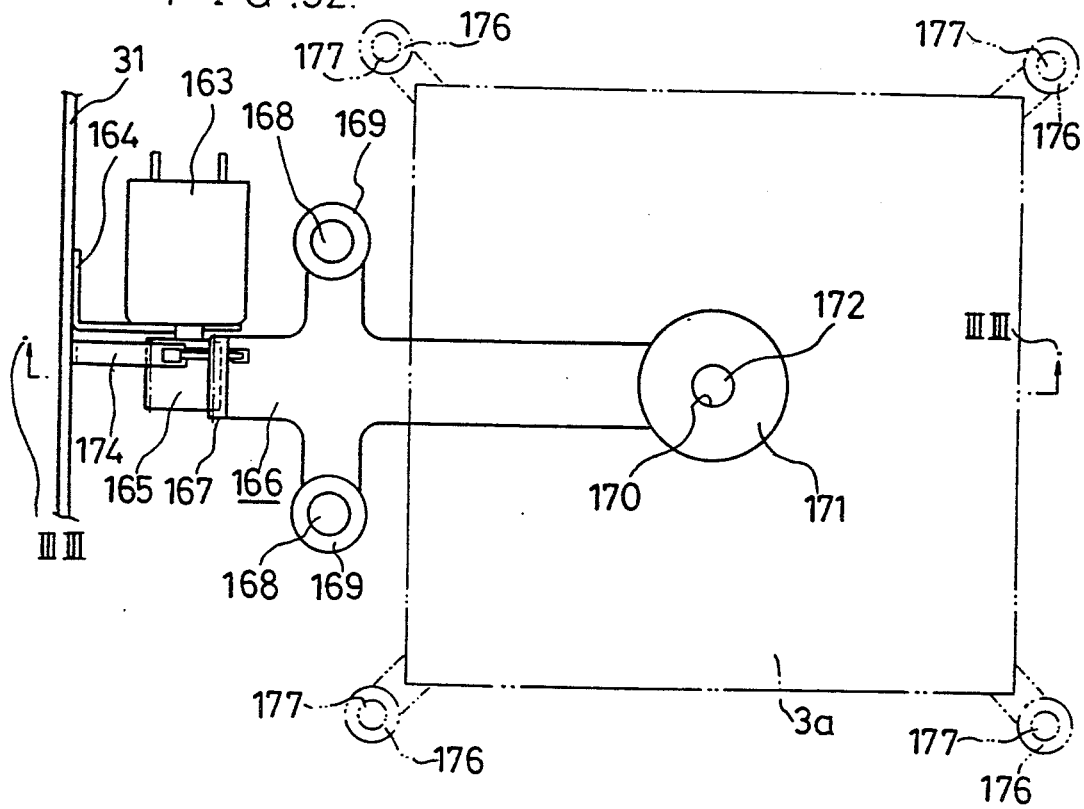
FIG. 32 is a plan view showing a vertical driving mechanism for a deck shown in FIG. 27 in detail.
Figure 33:
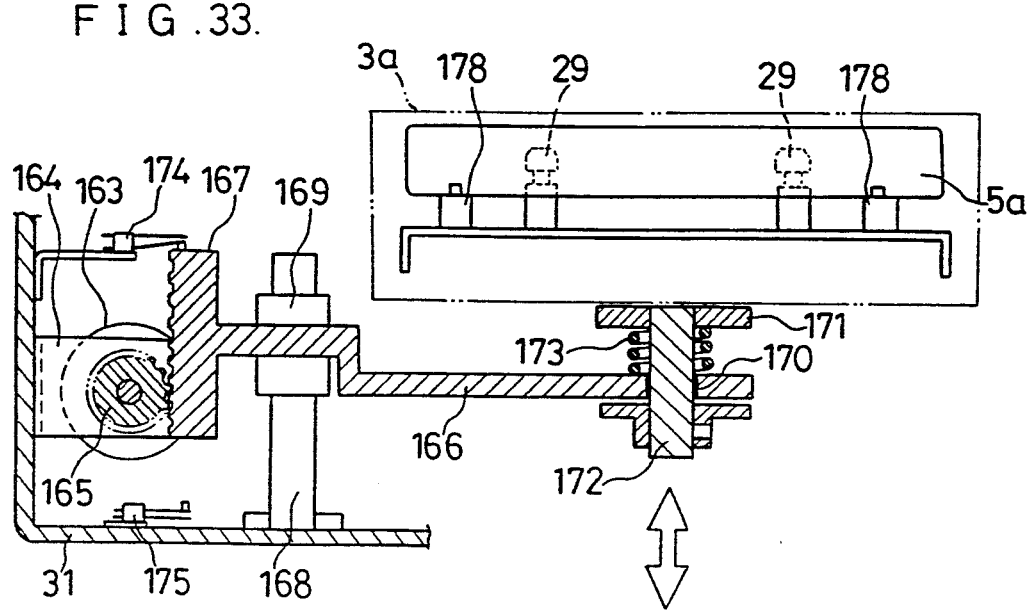
FIG. 33 is a sectional view taken along a line III III—III III in FIG. 32.

FIG. 32 is a plan view showing a vertical driving mechanism 136a for a deck 3a in detail and FIG. 33 is a sectional view taken along III III—III III in FIG. 32. Only deck 3a is shown that figure because the deck 3b is similarly constituted.

In FIGS. 32 and 33, reference numeral 163 designates a motor for vertically moving the deck 3a, which is fixed on the apparatus body 31 through a holder 164 and a gear 165 is fixed on the axis. Reference numeral 166 designates a lever having a rack 167 engaged with the gear 165 at its one end and bearings 169 at its middle sides, which are fitted in both posts 168 fixed in the apparatus body 31 so as to be vertically moved. The lever 166 can be only vertically moved along the both posts 168. The lever 166 also comprises a hole 170 provided at the other end thereof in which a shaft part 172 of a pressing element 171 for pushing up the deck 3a is fitted. The pressing element 171 can be moved only in a vertical direction and forced upward from the lever 166 by the compression spring 173. Reference numerals 174 and 175 designates switches for detecting a range of vertical movement of the lever 166 and reference numeral 176 designates a bearing fixed in each of four corners of the deck 3a, which is fitted in each of the four shafts 177 fixed on the apparatus body 31 so as to be vertically moved. The deck 3a can be moved only in vertical direction along the four shafts 177. Reference numeral 178 designates a reference pin fixed on the deck 3a for positioning the cassette 5a.

Next, operation thereof will be described.

Figure 34:
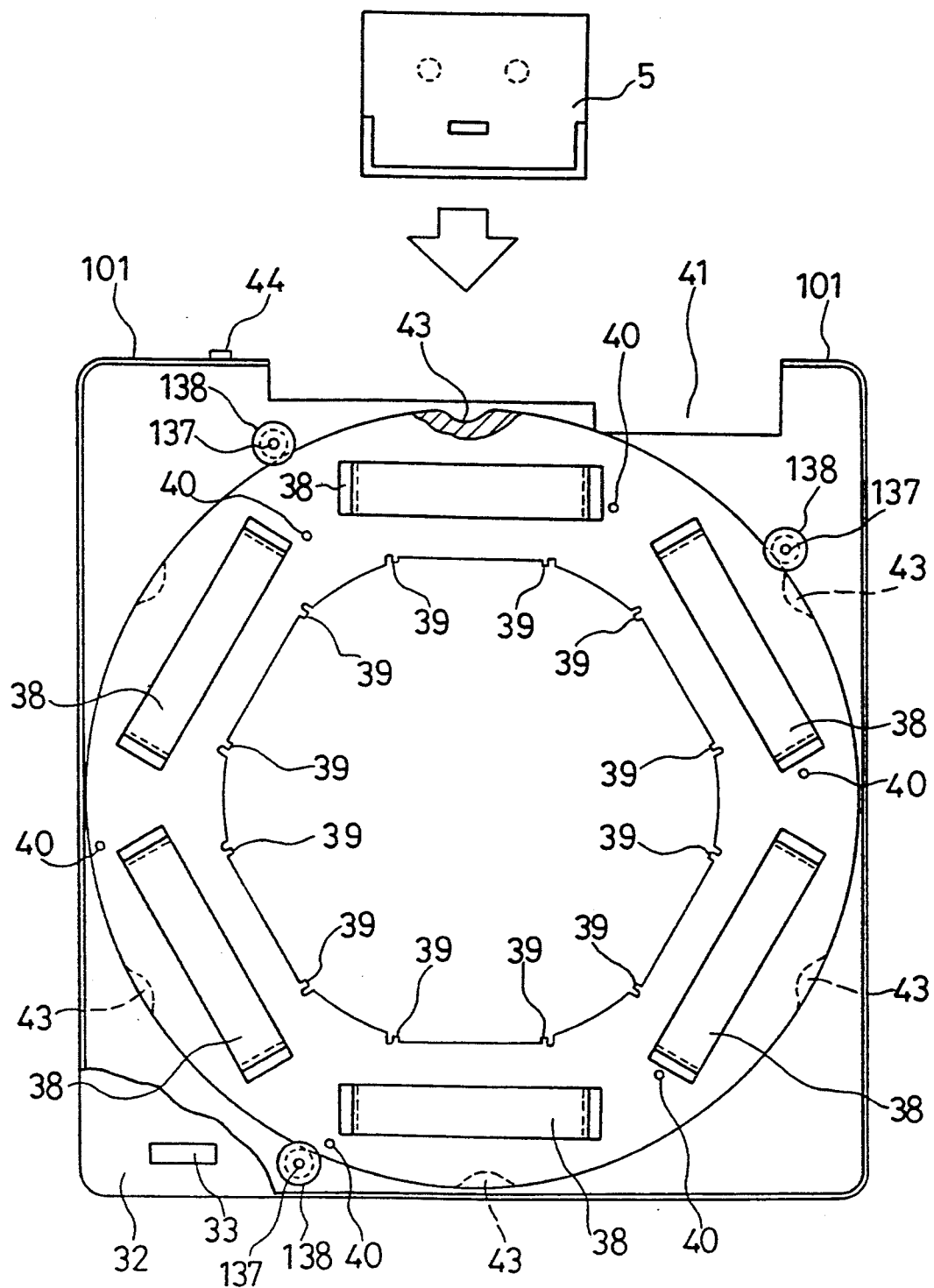
FIG. 34 is a plan view showing a method for mounting the cassette on the magazine in the sixth embodiment of the present invention.

FIG. 34 is a plan view showing a method for mounting the cassette 5 on the magazine 32. First, the magazine 32 is taken out of the apparatus body 31 and then the first cassette 5 is inserted through the cut off part 41 along the cassette holder 38 in a direction shown by the arrow in FIG. 34 to a position of the stopper 39. Then, the turntable 35 is revolved to bring another cassette holder 38 to the position of the cut off part 41 and then another cassette 5 is similarly inserted. Thus, six cassettes 5 are mounted as shown in FIG. 28.

When the cassettes 5 are all mounted, the magazine 32 is inserted in a direction shown by the arrow in FIG. 27 until the hole part 101 is fit in the reference pin 102 and then the projection 44 pushes the switch 62 and turns it ON.

Then, the cassette 5 to be recorded or reproduced and the deck 3 to be used are selected by the operation key (not shown). Although a case where the cassette 5a and the deck 3a are selected is only shown in this embodiment of the present invention, the same effect can be obtained even in a case where another cassette and deck are selected, so that description thereof is omitted for simplicity.

Figure 35:
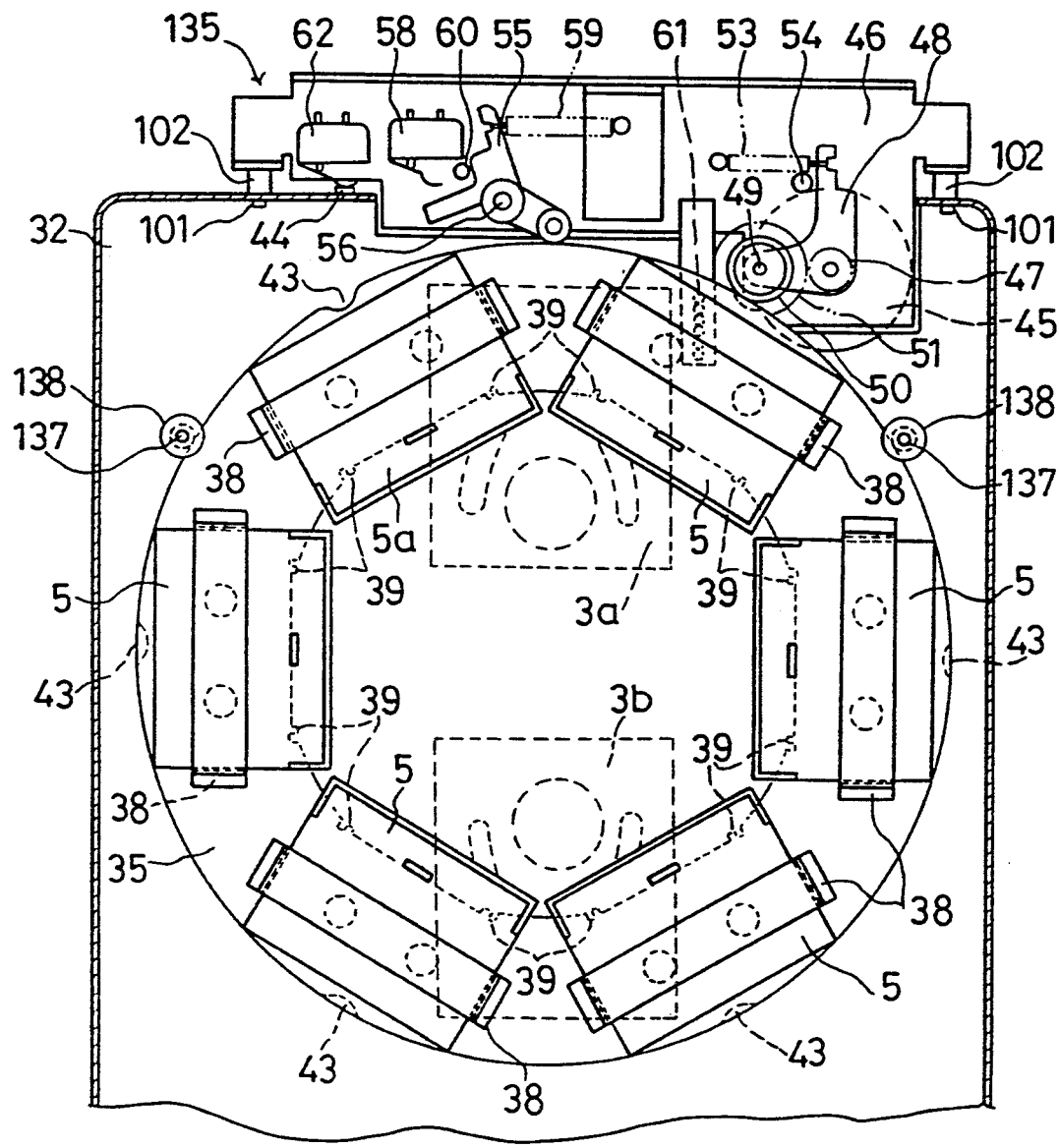
FIG. 35 is a detailed plan view showing a state in which the magazine is mounted but a cassette to be played is not yet selected in the sixth embodiment of the present invention.

FIG. 35 is a plan view showing a state in which the cassette 5a to be played is not yet selected after the magazine 32 is mounted. The idler 50 of the rotor 52 is pushed by the upper part of the outer peripheral surface of the turntable 35 and the lever 48 pivots clockwise against the spring 53 and then detaches itself from the stopper 54, so that force by the spring 53 is all used for pressing the idler 50 to the outer peripheral surface of the turntable 35. The roller 57 of the position detecting lever 55 is pushed by the lower part (except for the concave part 43) of the outer peripheral surface of the turntable 35. Then, the position detecting lever 55 pivots counterclockwise against the spring 59 and then detaches itself from the stopper 60, when the switch 58 is OFF. The deck 3a is lowered to a position in which the reel rest 29 does not interfere with the magazine 32 and it is at rest while the switch 175 is ON.

Figure 36:
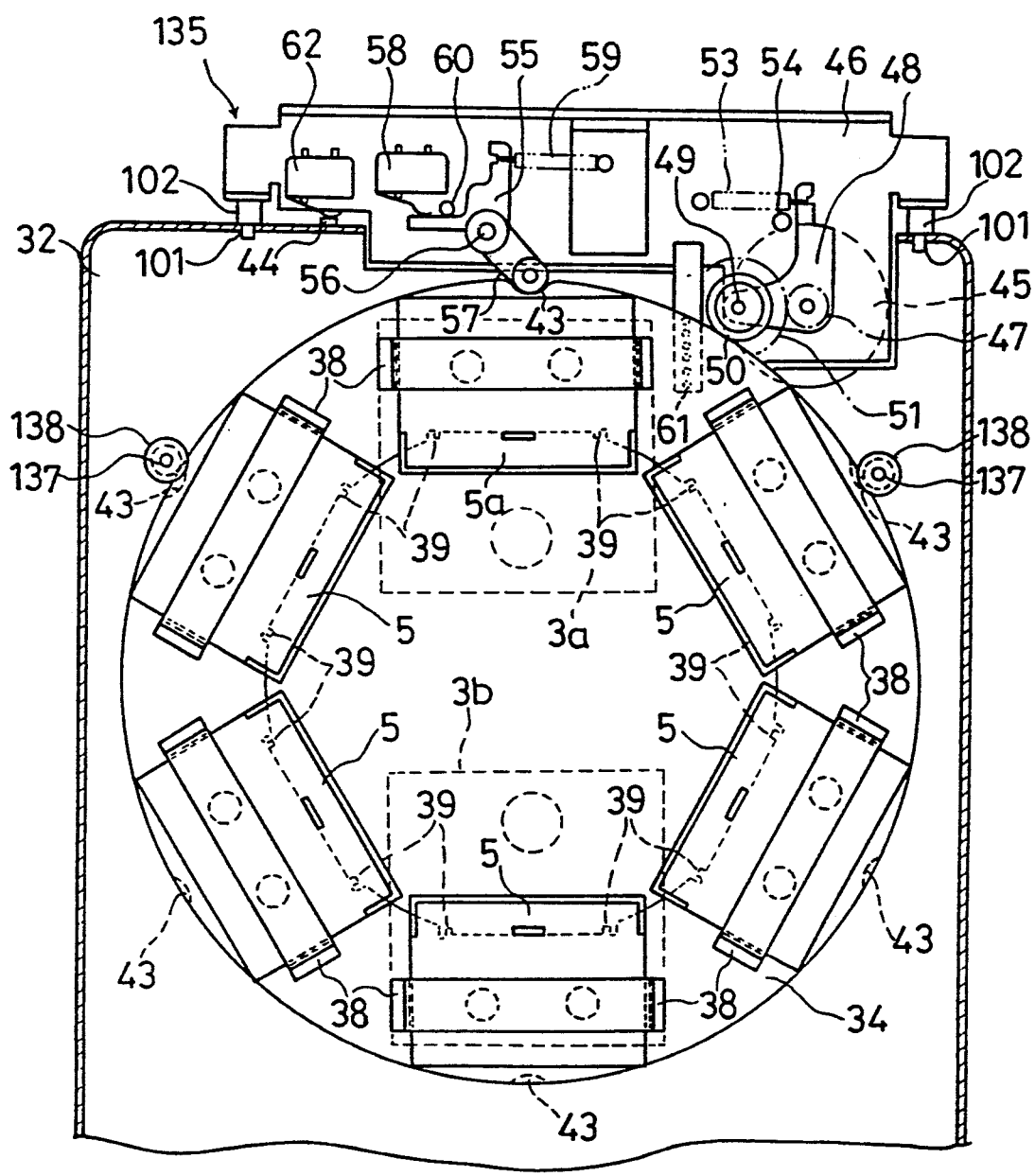
FIG. 36 is a detailed plan view showing a state in which the cassette to be played is selected in the sixth embodiment of the present invention.

FIG. 36 is a plan view showing a state in which the cassette 5 to be played is selected. When the cassette and the deck are selected, the motor 45 is rotated and then the turntable 35 is revolved through the gear 47 and the rotor 52. Then, when the roller 57 of the position detecting lever 55 is engaged with the concave part 43 of the turntable 35, the switch 58 is turned ON. At this time, if the photoelectric switch 61 for the cassette 5 to be played is ON, the motor 45 is stopped but if it is OFF, the motor 45 is still rotated and then the same determination is made at the next concave part 43.

As described above, when the thus selected cassette 5a is set on the deck 3a to be used, the motor 163 is rotated and then the lever 166 is moved upward to push up the deck 3a. When the cassette 5a comes in contact with the reference pin 178, the pressing element 171 is stopped but the lever 166 is still moved upward. Therefore, the deck 3a is pressed to the cassette 5a by the compression spring 173 and when the switch 174 is turned ON, the motor 163 is stopped. Thus, the cassette 5a can be prepared for playing.

When another cassette 5 is selected next, the motor 163 is rotated first and the lever 166 is lowered. Then, the deck 3a is lowered to a position in which the reel rest 29 does not interfere with the magazine 32. When the switch 175 is turned ON, the motor 163 is stopped and then the motor 45 is rotated. Thus, the next cassette 5 is selected.

Any tape cassette can be mounted on any deck and then recorded or reproduced in accordance with this embodiment of the present invention. When a signal reproducing or editing operation is performed between the plurality of cassettes, the reproducing deck 3a, the recording deck 3b, the reproducing cassette 5a and the recording cassette 5b are selected by means not shown.

Thus, by the same operation as described above, the reproducing cassette 5a is set on the reproducing deck 3a and the recording deck 3b is set on the recording cassette 5b. Next, when an operation button (not shown) is pushed by the user, the deck 3a starts a reproducing operation and the deck 3b starts a recording operation, whereby a signal reproducing or editing operation is performed between the cassettes 5a and 5b.

Although the signal reproducing or editing operation is performed using the plurality of decks in the above sixth embodiment of the present invention, simultaneous reproducing and recording operations may be performed.

Although two decks 3a and 3b are arranged in opposite direction in the sixth embodiment of the present invention, it is more preferable that the decks 3a and 3b are arranged so as to be moved in a plane parallel to the turntable 35 or the decks are provided by the same number of the cassettes 5.

Figure 37:
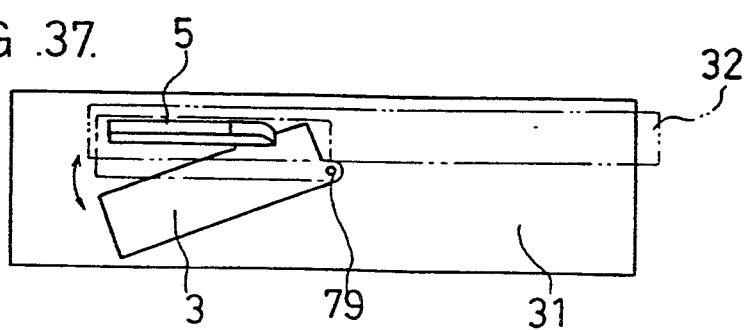
FIG. 37 is a side view showing a seventh embodiment of the present invention.
Figure 38:
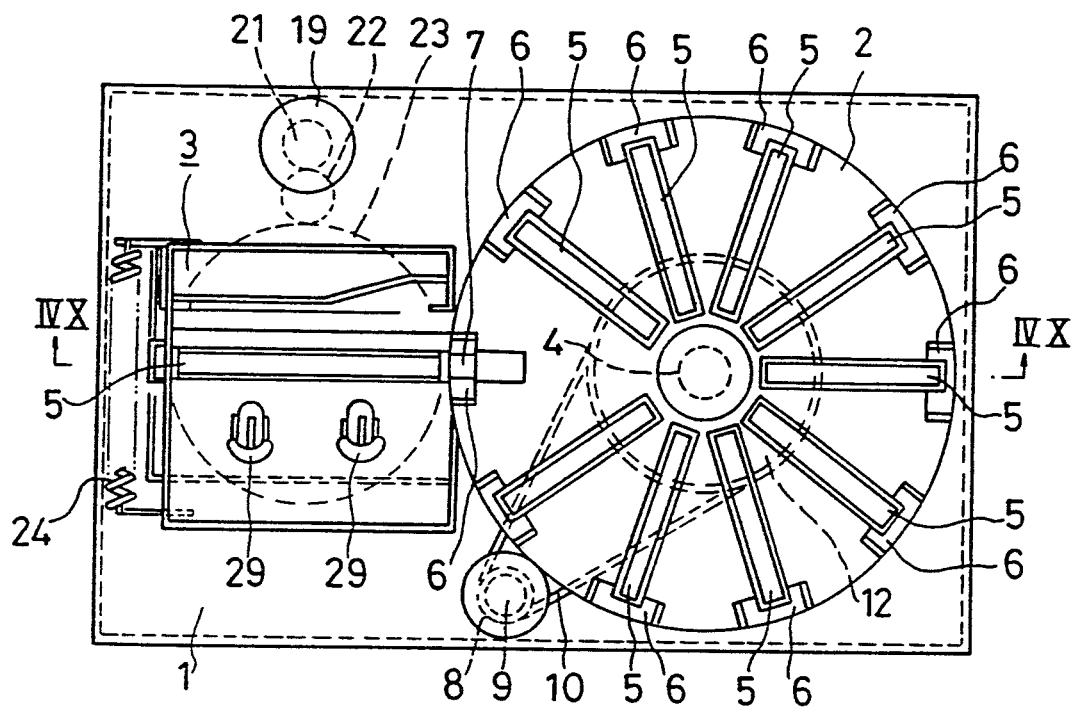
FIG. 38 is a front view showing a conventional automatic cassette tape recording and reproducing apparatus.
Figure 39:
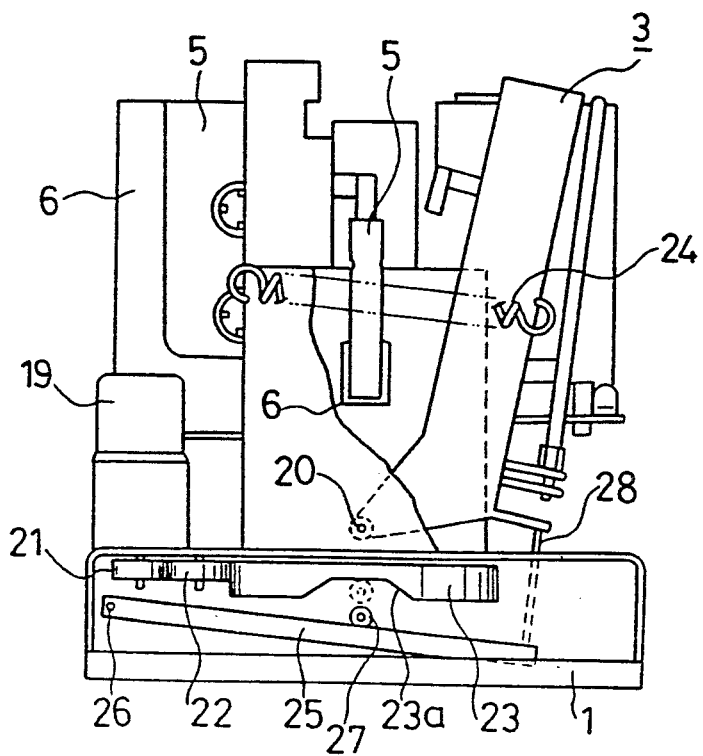
FIG. 39 is a left side view of FIG. 38.
Figure 40:
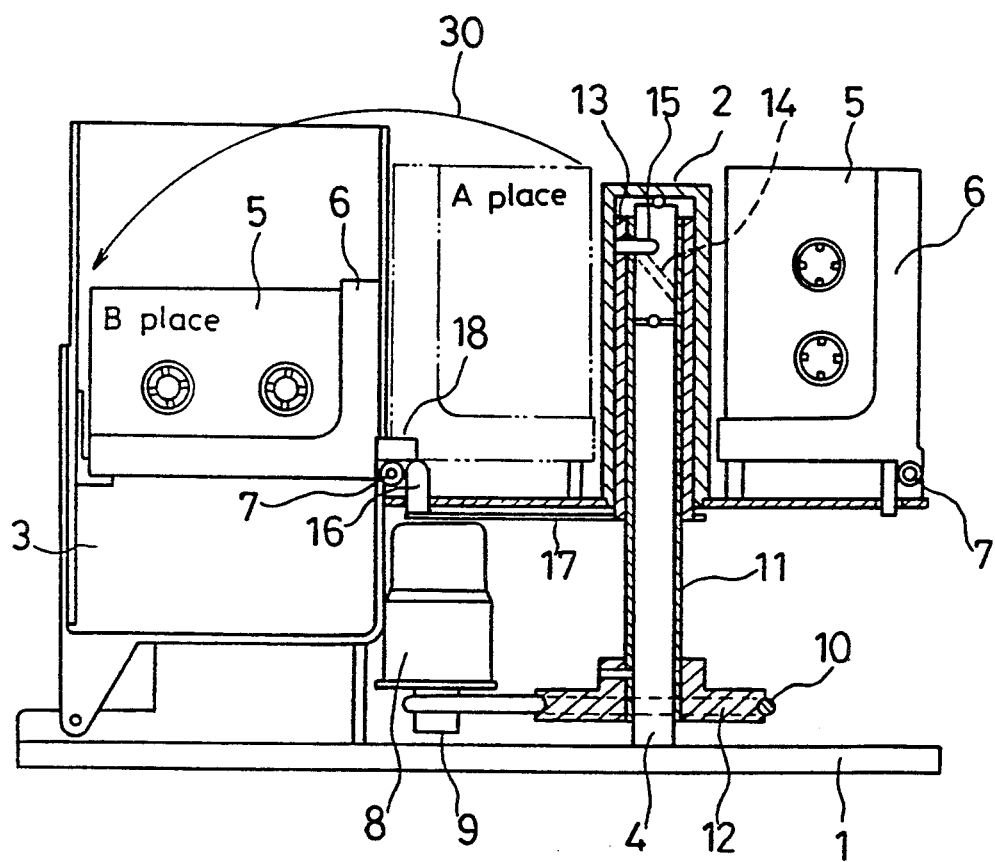
FIG. 40 is a sectional view taken along a line IV X—IV X in FIG. 38.

Although the vertical driving mechanism 136 for vertically driving the deck 3 is used as the deck driving mechanism which mounts the selected cassette 5 on the deck 3 in the sixth embodiment of the present invention, a mechanism which swings the deck 3 around the supporting shaft 79 thereby to vertically move it may be used as in a seventh embodiment of the present invention in FIG. 37.

In addition, although the cassette 5 is selected by the operation key in the first to seventh embodiments of the present invention, a memory circuit and a system control circuit may be provided in the apparatus and when the order of the cassettes to be played is input, it is stored in the memory circuit and then the cassette 5 to be played is automatically and continuously selected by the system control circuit.

Although the turntable 35 is revolved when it is pressed to the idler 50 whose outer peripheral surface is formed of the elastic body in the first to seventh embodiments of the present invention, the upper part of the outer peripheral surface of the turntable 35 and the outer peripheral surface of the idler 50 may consist of gears and the turntable 35 may be revolved by engaging the both gears.

In addition, although the photoelectric switch 61 is provided at each of the identification hole 41 in the first to seventh embodiments of the present invention, when the number of the photoelectric switches 61 is n, an identification signal having n bits, that is, $2^n$ patterns can be obtained, whereby the identification holes 41 can be formed as a pattern. In this case, also the same effect can be provided.

In addition, the cassette 5 may be a music tape for analog or digital, video tape such as VHS, beta or 8 mm VTR or the like.

According the present invention, the driving mechanisms for preparing the cassette for playing comprises the mechanism for revolving the turntable in which the cassettes are housed when the cassette is selected and the mechanism for swinging the swinging base when the cassette is mounted on the deck, in which whose mechanisms each have one degree of freedom. As a result, the driving mechanisms become simple, the number of parts is reduced and moving space of the deck and the cassette can be reduced, whereby the size thereof can be also reduced.

As described above, according to the present invention, the driving mechanisms for preparing the cassette for playing comprises the mechanism for revolving the turntable in the magazine in which the cassettes are housed when the cassette is selected and the mechanism for vertically moving the deck when the cassette is mounted on the deck, in which those mechanisms each have one degree of freedom. As a result, the driving mechanisms become simple, the number of parts is reduced and moving space of the deck and the cassette can be reduced, whereby the size thereof can be reduced.

As described above, according to the present invention, a plurality of decks are provided. Accordingly a signal reproducing or editing operation can be performed between a plurality of cassettes. In addition, the driving mechanisms for preparing the cassette for playing comprises the mechanism for revolving the turntable in the magazine in which the cassettes are housed when the cassette is selected and the mechanism for vertically moving the deck when the cassette is mounted on the deck, in which those mechanisms each have one degree of freedom. As a result, the driving mechanisms become simple, the number of parts is reduced and moving space of the deck and the cassette can be reduced, whereby the size thereof can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cassette tape recording/reproducing apparatus comprising:
   a magazine for removably housing a plurality of cassettes within cassette holders, said magazine having a turntable mounted therein upon a shaft fixed within said magazine, said cassette holders being secured to said turntable; and
   recording/reproducing means, for recording and reproducing data on and from said plurality of cassettes, said recording/reproducing means being disposed within a housing and comprising
      a first wall defining an opening adjacent a top portion of the housing, said magazine being insertable into said recording/reproducing means through the opening,
      head means, mounted in a lower portion of said housing, for recording and reproducing data on and from said plurality of cassettes,
      magazine holder means, pivotably mounted about an axis extending adjacent a second wall, which is opposite said first wall, for holding and selectively positioning said magazine within said recording/reproducing means, and
      solenoid means, for directly urging said magazine holder means downward pivotably about said axis towards said lower portion of said housing to position a selected one of said plurality of cassettes downward into contact with said head means.

2. The cassette tape recording/reproducing apparatus of claim 1, said recording/reproducing means further comprising turntable rotating means, mounted in said lower portion of said housing adjacent said second wall, having
   idler means extendable into said magazine through said magazine holder means, for engaging an outer peripheral surface of said turntable; and
   a motor, operatively coupled to said idler means, for rotating said turntable through said idler means.

3. The cassette tape recording/reproducing apparatus of claim 2 further comprising:
   selection means, coupled to said turntable rotating means, for controlling said turntable rotating means to align said selected one of said plurality of cassettes with said head means in accordance with user instruction; and
   position detecting means, coupled to said selection means, for generating a detection signal identifying when said turntable is rotated to a proper position aligning said selected one of said plurality of cassettes with said head means, .
   said position detecting means comprising a photoelectric switch, mounted in said lower portion of said housing adjacent said second wall and extendable above said magazine holder means, for determining when an identification hole formed within said turntable corresponding to said selected one of said plurality of cassettes passes thereunder, to generate said detection signal which stops said turntable rotating means.

4. A cassette tape recording and reproducing system comprising:
   magazine means for removably housing a plurality of cassettes therein in cassette holders mounted on a rotatable turntable; and
   recording/reproducing means, housed within a rectangular body which includes an opening in a front wall through which said magazine means is inserted, for recording and reproducing data on and from said plurality of cassettes, comprising head means, mounted on a base platform of said rectangular body, for recording and reproducing data on and from said plurality of cassettes, turntable rotating means, mounted upon said base platform adjacent a back wall which is disposed opposite said front wall, for rotating said rotatable turntable within said magazine means, pivotable magazine holder means, mounted to be pivotable about a horizontal shaft extending along said back wall of said rectangular body, for holding and selectively positioning said magazine means within said recording/reproducing means, and urging means, mounted upon said base platform and operatively coupled to an upper surface of said pivotable magazine holder means, for directly urging said pivotable magazine holder means downward about said horizontal shaft, to position a selected one of said plurality of cassettes into contact with said head means.

5. The cassette tape recording and reproducing system of claim 4, said urging means comprising:

solenoid means, having an arm operatively coupled to and extendable outward along said upper surface of said pivotable magazine holder means, for urging said pivotable magazine holder means downward when in an extended position.

6. The cassette tape recording and reproducing system of claim 4, said turntable rotating means comprising:

idler means, mounted on said base platform adjacent said back wall and extendable into said magazine means through said pivotable magazine holder means, engaging an outer peripheral surface of said rotatable turntable, for rotating said rotatable turntable within said magazine means; and a motor, operatively coupled to said idler means, for rotating said idler means.

7. The cassette tape recording and reproducing system of claim 6, further comprising:

selection means, coupled to said turntable rotating means, for controlling said turntable rotating means to align said selected one of said plurality of cassettes with said head means in accordance with user instruction; and position detecting means, coupled to said selection means, for generating a detection signal identifying when said rotatable turntable is rotated to a proper position aligning said selected one of said plurality of cassettes with said head means, said position detecting means comprising a photoelectric switch, mounted upon said base platform adjacent said back wall an extendable above said pivotable magazine holder means, for determining when an identification hole formed within said rotatable turntable corresponding to said selected one of said plurality of cassettes passes thereunder, to generate said detection signal which stops said turntable rotating means.

* * * * *